April 9, 1963 E. I. BLUMENTHAL 3,085,229
CARD-TO-TAPE CONVERTER

Filed June 13, 1955 15 Sheets-Sheet 1

FIG. I

INVENTOR
EDWIN I. BLUMENTHAL
BY
ATTORNEY

April 9, 1963  E. I. BLUMENTHAL  3,085,229
CARD-TO-TAPE CONVERTER
Filed June 13, 1955  15 Sheets-Sheet 3

INVENTOR
EDWIN I. BLUMENTHAL
BY
ATTORNEY

April 9, 1963  E. I. BLUMENTHAL  3,085,229
CARD-TO-TAPE CONVERTER
Filed June 13, 1955  15 Sheets-Sheet 5

INVENTOR
EDWIN I. BLUMENTHAL
BY *JhL Sterling*
ATTORNEY

April 9, 1963  E. I. BLUMENTHAL  3,085,229
CARD-TO-TAPE CONVERTER
Filed June 13, 1955  15 Sheets-Sheet 6

INVENTOR
EDWIN I. BLUMENTHAL
BY
ATTORNEY

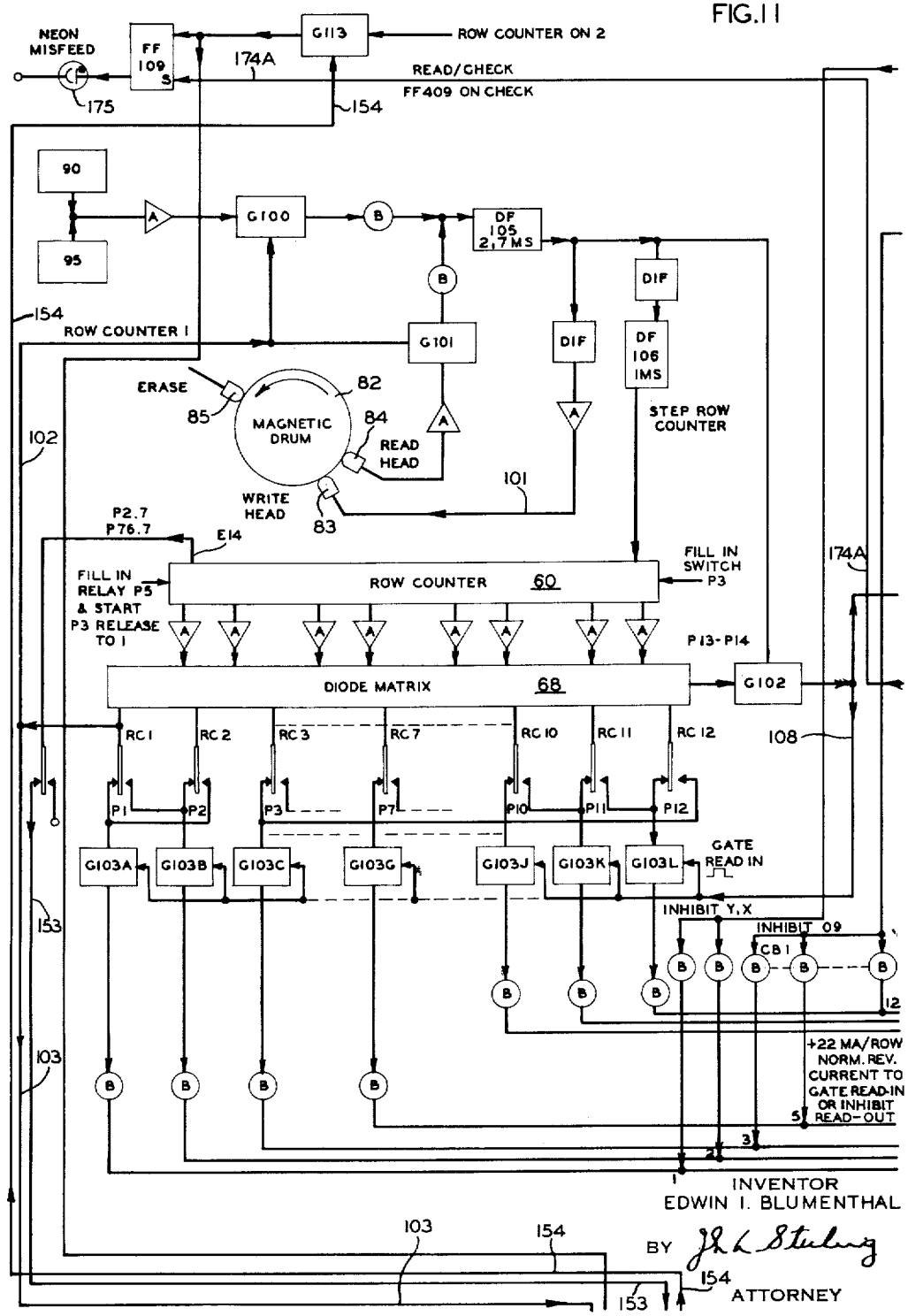

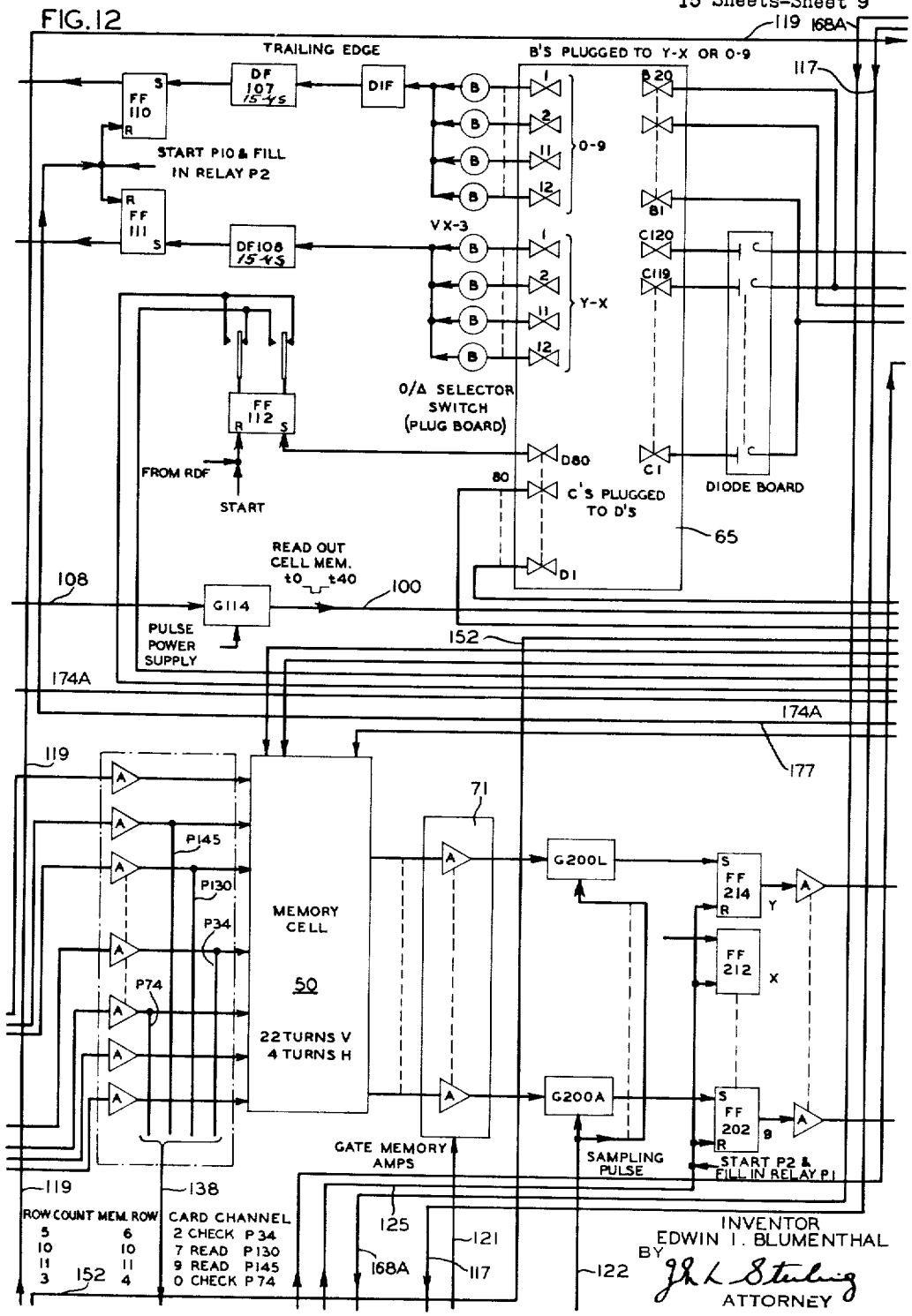

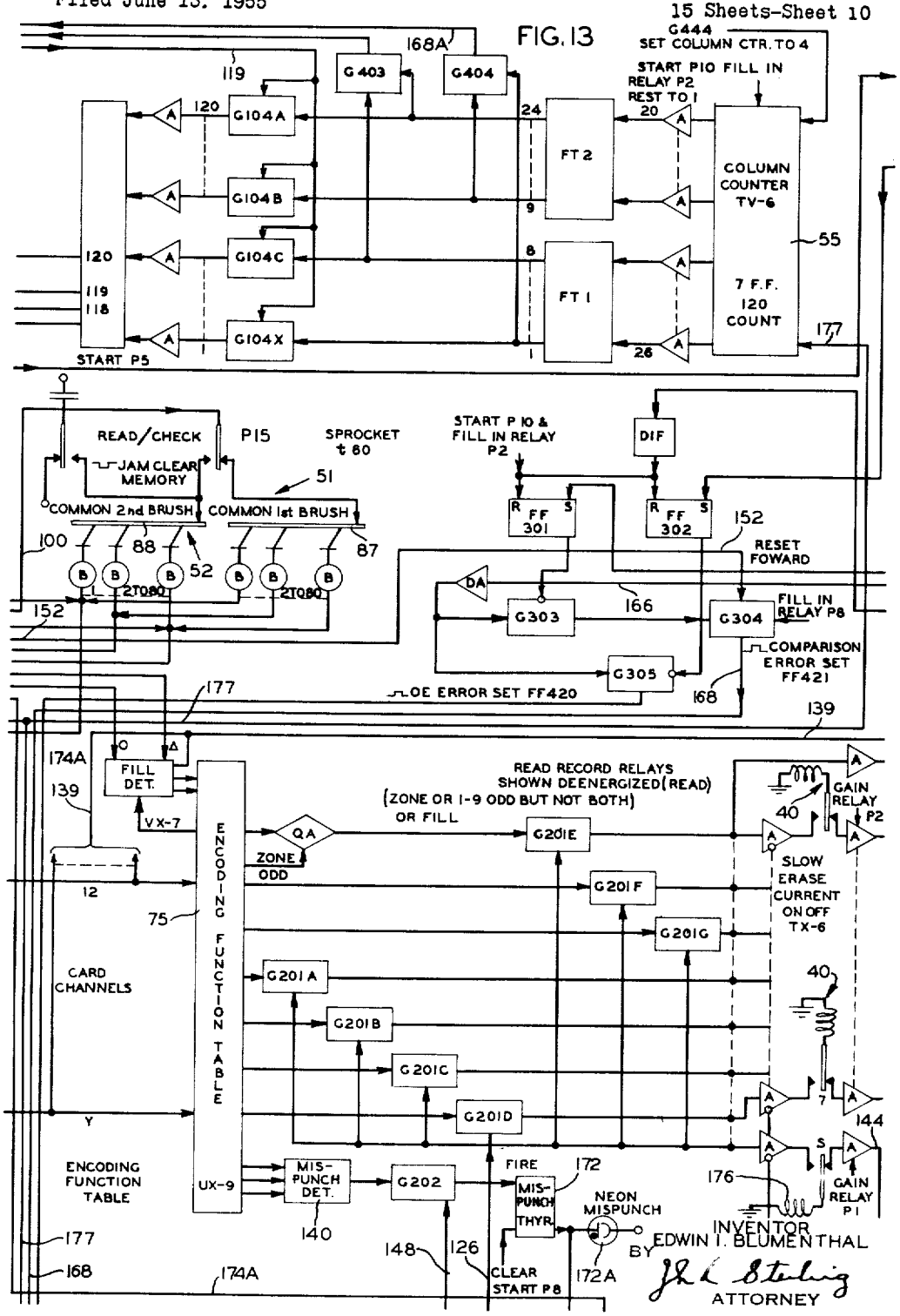

April 9, 1963

E. I. BLUMENTHAL 3,085,229

CARD-TO-TAPE CONVERTER

Filed June 13, 1955

INVENTOR
EDWIN I. BLUMENTHAL

BY *J. L. Sterling*

ATTORNEY

April 9, 1963

E. I. BLUMENTHAL 3,085,229

CARD-TO-TAPE CONVERTER

Filed June 13. 1955

INVENTOR
EDWIN I. BLUMENTHAL

BY *J. L. Sterling*

ATTORNEY

United States Patent Office 3,085,229
Patented Apr. 9, 1963

3,085,229
CARD-TO-TAPE CONVERTER
Edwin I. Blumenthal, Conshohocken, Pa., assignor, by mesne assignments, to Sperry Rand Corporation, New York, N.Y., a corporation of Delaware
Filed June 13, 1955, Ser. No. 515,102
32 Claims. (Cl. 340—172.5)

This invention relates to a method and means of converting data representations, punched at any one or more of a plurality of positions in a record card, into magnetic tape recordings in pulse code of the same data for use in a high speed computer or other pulse controlled device.

The invention, in the present disclosure, makes use of a standard punched card having data designation positions defined by the point of intersection of eightly columns extending widthwise of the card and twelve rows extending lengthwise of the card. The cards are fed, upper edge first, from a supply bin through a plurality of stations at each of which the leading edge of the card, as well as each data perforation in row by row order, is sensed. The card feed mechanism is fully shown in an application of common assignment Serial Number 514,860, filed June 13, 1955, in the names of E. Blumenthal and F. Lopez, now Pat. No. 3,031,136. The data punched in the card is transferred, through a magnetic core memory and a translator or encoder, to a magnetic tape in the form of coded information suitable for use in the computer. Each operation starts with a maximum of eighty card characters and ends with one hundred and twenty characters recorded on the tape, the additional characters beyond eighty being supplied by the split columns of a card through a plugboard or by the converter. The arrangement of the characters in the cards may be transposed for recording on the tape through the medium of a plugboard, and in order to guarantee that the same information is recorded on the tape as was punched in the cards, the converter reads back the one hundred and twenty characters just recorded on the tape and also the combination of pulses defining each character, as read back from the tape, is given an odd-even check.

It is an object of the invention to successively sense the same card twice and read into a memory unit the same data obtained from the card at each sensing station; to encode the data first sensed, after readout thereof from the memory, and magnetically record the same on a tape moving in a forward direction; to read the recorded data from the tape, moving in rearward direction, in order to odd-even check the combination of pulses constituting each character of data and the predetermined total characteristics of the data in its encoded form; to again read the same encoded data from the tape, moving again in forward direction, and pass it to a comparator after it is decoded to its original card form; to read out the memory the data entered therein on the second sensing and enter it directly in the comparator to be compared with the decoded data for error detection; to repeat odd-even and greater or less than one hundred and twenty checks at different gain settings; and to inaugurate an error routine with respect to the card and the tape should an error be detected.

Another object of the invention is to pass the same data of both sensings through different distribution systems of a magnetic-core memory so that the data of various columns of the card do not use the same memory cores during the first and second sensings whereby when the odd-even and counting checks, of the data sensed the first time, have been completed, the data sensed at the second station has been completely stored in the memory a second time, and at the end of the comparison operation the tape is in position to begin recording the data of the following card and the card just sensed has been passed to an output bin.

A further object of the invention is to provide for the generation of a sprocket pulse for determining the proper time for reading each of the rows of punched holes in a card as it passes beneath the sensing means and for generating a set of twelve sprocket pulses, individually timed for each card, and controlled by the operation of the card feeding means as shown in an application of common assignment Serial Number 515,087, filed June 13, 1955, in the name of M. Gottlieb, now Pat. No. 2,909,319.

A still further object of the invention is to provide for sprocket pulse generating in such manner that the pulse, in addition to controlling the sensing of the card can be employed in other operations, such as counting the rows of the card as the data openings therein are sensed, energizing certain of the core windings of the memory unit, and providing timing control of the rest of the electronic and servo systems.

Other objects of the invention are to provide for the filling in of a span of tape as part of a blockette with a definite number of characters added to the eighty or less obtained from the card to make a predetermined total number of characters constituting a blockette and through the medium of a transposing agent make possible the rearrangement of the data obtained from the card and the insertion of the added fill-in characters wherever desired, to control the operation of the tape for differential movement so that variable spacing can be had between blockettes of recorded data and groups of blockettes; to provide a slow erase current for the read-record heads of the tape and control thereof during movement and stoppage of the tape; to prevent the sending out of erroneous pulses under control of the card leading edge detector; to provide for the energization of the row reading brushes; to provide row and column counting means, for controlling the pulse input gates in order to distribute binary digits among the memory cells, for reading out the information stored in the memory units for transfer to recording circuits; and to provide card counting and mis-punched card circuits for controlling the operation of the card and the tape feeding means.

The foregoing and other objects of the invention particularly relating to the details of construction and operation will become apparent from the following description when read in conjunction with the accompanying drawings in which:

FIG. 10 is a diagram showing how the various FIGS. 11 to 18 of the unit connections are arranged;

FIGS. 11 through 18 illustrate diagrammatically in block form, a group of units and connections therebetween for carrying out the various operations inaugurated by the sensings of the data card.

The present invention includes a card mechanism through which punched data cards are fed; an electronic unit including a memory device; a plugboard and associated means for processing the data read from the cards, and a tape device for handling the operation of a tape upon which is magnetically recorded data obtained from the cards, which, after being checked for correctness, is to be used in a high speed computer of the "Univac" referred to in application Serial No. 279,714, filed March 31, 1952, by E. I. Blumenthal et al., now Pat. No. 3,056,947.

The computer is designed to accept data from the tape moving at a uniform speed of one hundred inches per second. The data on the tape may be recorded at a pulse density of one hundred and twenty digits per inch or higher and is recorded in blocks spaced 2.4 inches apart. Each block consists of six blockettes and a blockette contains one hundred and twenty characters. A single block therefore, holds seven hundred and twenty digits and a digit in turn is represented by coded magnetized areas on the tape when any of the eight channels of a read-record-erase head, is energized. One of the channels is designated as a sprocket channel. The code system used in the eighty column, twelve row card is such that the bottom ten rows are used for numerals and the top three rows, are used in twenty-seven combinations with the bottom rows, one through nine, for alphabetic data. The twenty-seventh combination zero-one is used for a non-alphabetical symbol or designation. The code is shown hereafter with the corresponding binary code representations as put on the tape for use in the "Univac" computer.

For the purpose of illustration herein, the rows from top to bottom of the card will be designated as one to twelve although the top three rows are referred to in some data card practice as "Y," "X" and "0" and the remainder 1 to 9. When the top two rows or the "Y" and "X" are punched, it is referred to as "overpunching" and by means of a plugboard the overpunched columns can be separated from 0, 1–9 and the information in each part recorded in two different positions on the tape so that the eighty columns on the card may fill more than eighty character positions on the tape. The cards are fed into the sensing mechanism top edge first with the number one or "Y" row to be the first one sensed.

Figure 1:
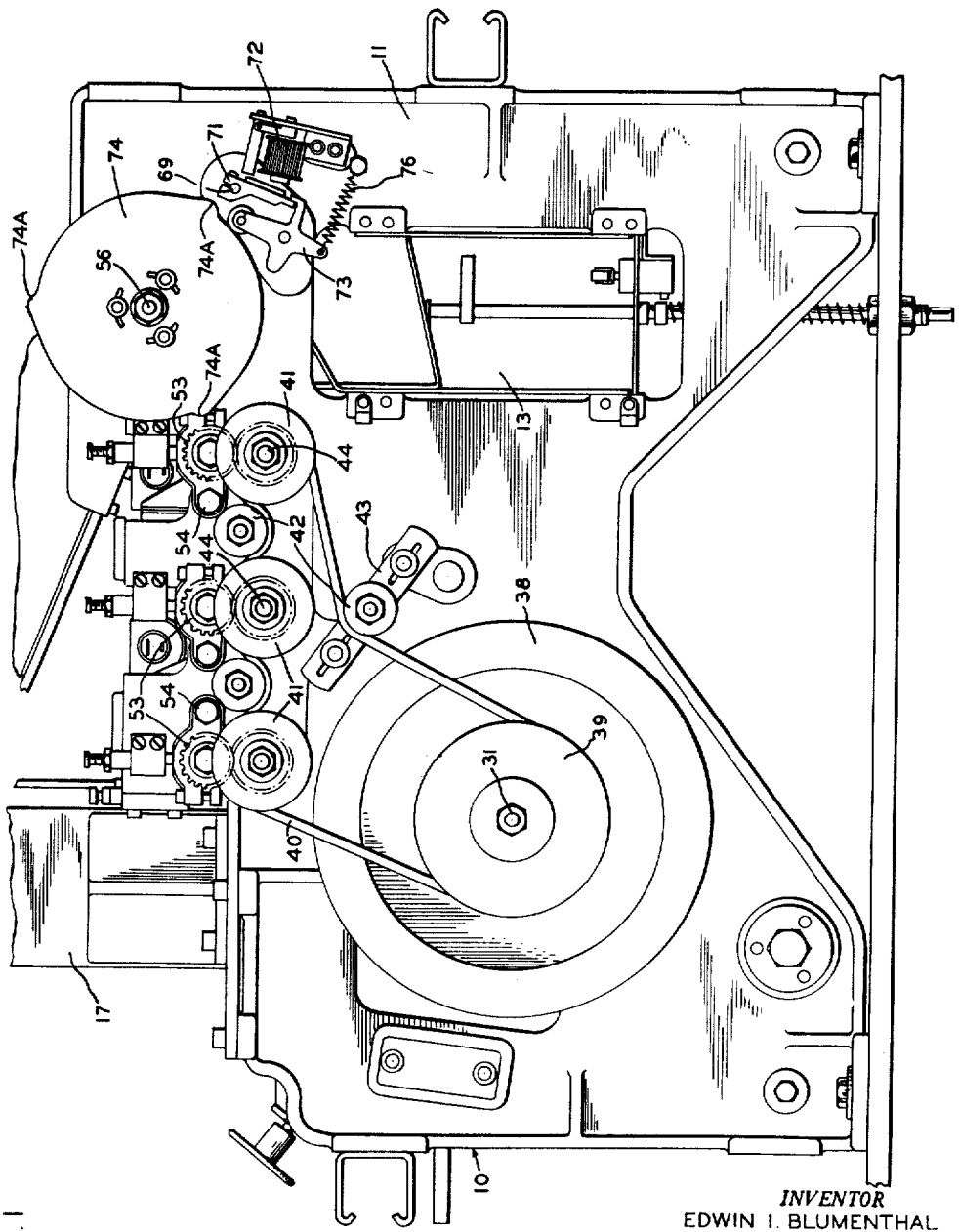
FIG. 1 is a view in elevation looking at the right side of the card sensing portion of the machine showing the feed roll driving mechanism and error card control means.
Figure 2:
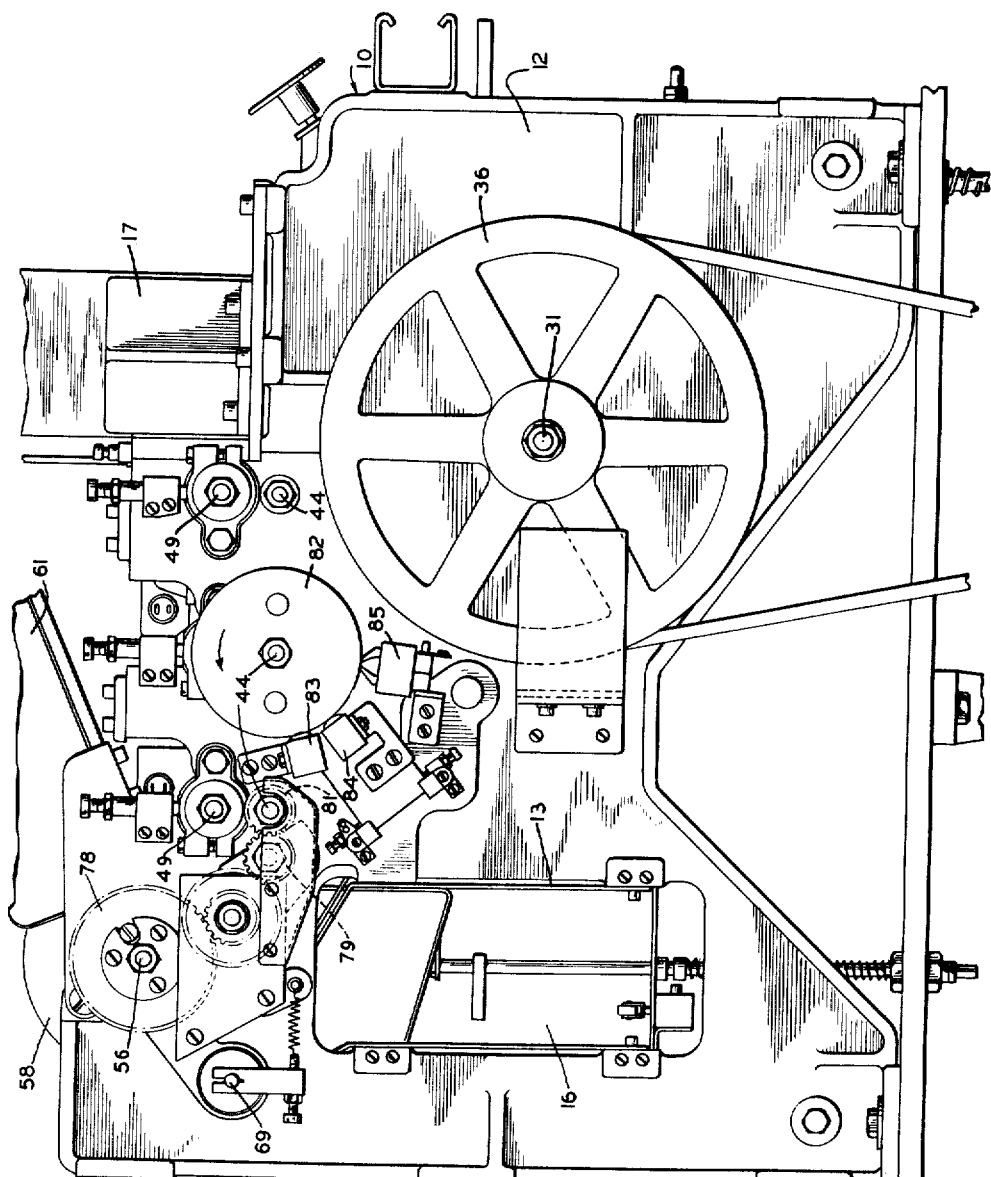
FIG. 2 is a view in elevation looking at the left of the machine shown in FIG. 1 and illustrating a sprocket pulse magnetic drum and the write, read and erase heads associated therewith.
Figure 3:
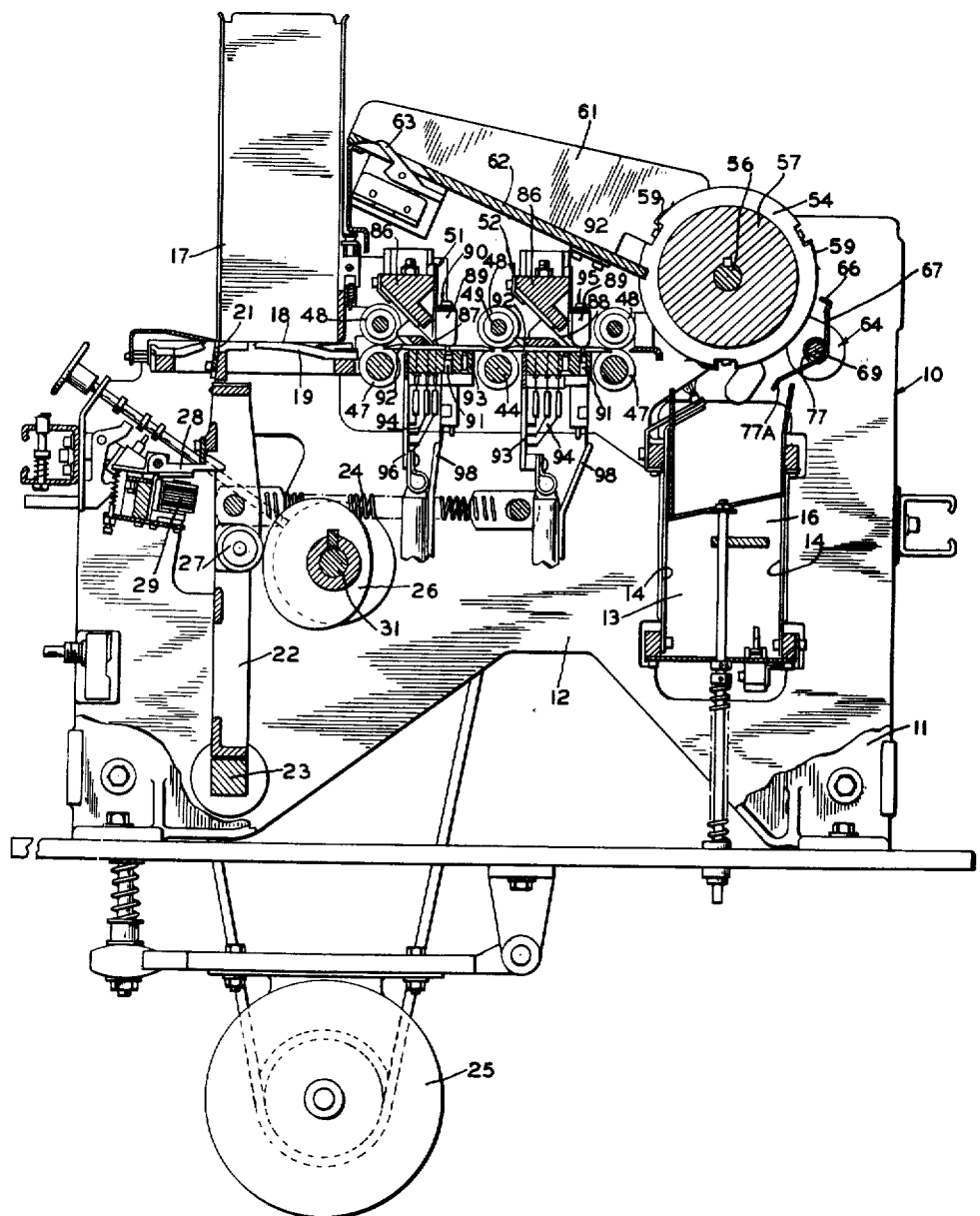
FIG. 3 is a vertical section taken through the machine from front to rear and shows the card handling and sensing mechanism.

Referring to the drawings in detail and in particular to FIGS. 1, 2 and 3 a card feeding and sensing mechanism is indicated at 10 which includes right and left side frames 11 and 12, respectively, shaped to provide openings 13, for the mounting of panels 14 forming the walls of a reject or error-card pocket 16, and for the mounting of various cross shafts and bars. The cards to be fed to the machine are held in a supply or input bin 17, mounted on top of the frame at the front thereof, and are supported on a bottom grid 18 through the slots 19 of which a picker knife 21 is oscillated. The knife is adjustably attached to the upper end of a picker arm 22 mounted on a cross bar 23 pivoted in the side walls of the frame. The arm 22 is pulled forwardly by a spring 24 but controlled in its card feed and retract movements by a cam 26 against which bears a roller 27 carried on the arm. The cam is shaped to provide a slight overthrow in its retract movement of the arm so that an arm retaining latch 28, controlled by a magnet 29, is free to operate at a predetermined time as will be later explained. The cam 26 is secured on a main drive shaft 31, mounted in suitable bearings in the side frames and projecting therebeyond at its opposite ends.

One end of the shaft has keyed thereto a pulley 36 (FIG. 2) driven from an adjustably mounted motor 25 (FIG. 3) by a belt while the other end of the shaft, at the right side of the machine, has keyed thereto a flywheel 38 (FIG. 1) and a pulley 39. The drive of the latter is transmitted by a belt 40 to three feed roller pulleys 41 and about idlers 42, one of the latter of which is mounted for adjustment to provide a belt tensioning means 43. The pulleys 41 are secured to the ends of lower feed roll shafts 44 journalled in suitable bearings and mounting laterally spaced feed rollers 47 which coact with feed rolls 48 mounted on upper feed roll shafts 49. The three sets of feed rolls, driven by the pulleys 41, are designated as the intake, intermediate and eject rolls and are equally spaced from each other to feed record cards successively through first and second sensing stations 51 and 52 respectively, from the supply bin 17.

The upper and lower feed roll shafts are connected by meshing spur gears 53 and the upper shafts are supported at their opposite ends in bearings 54 mounted for vertical adjustment on the frame. The latter also supports bearings in which rotates a drum shaft 56 to which is secured a card stacking drum 57 (FIG. 3) disposed in the median line of the machine and flanked by laterally spaced card guide discs 58. The drum supports, at spaced intervals on its periphery, card holding clips 59 into which the cards are forced for transfer to an output or stacking bin 61, the bottom plate 62 of which arrests the movement of the cards and thus releases them from the clips as the latter pass downwardly through suitable slots in the drum end of said bottom plate. The latter is provided with a bin switch 63 for indicating a fully loaded condition of the bin 61.

When, as the result of a sensing at either sensing station an error routine is inaugurated in the circuit as will be later explained, an error card ejector 64 (FIG. 3) is operated to swing the projecting upper ends 66 of a rock plate 67 into the path of a card carried in one set of the clips 59 to drop the error card into the error bin 16. The ejector is mounted on a cross bar 69, pivoted in the side frames, and protruding at the right end to support an armature 71 operated by a magnet 72 when released by a latch 73 biased against an eject cam 74 by a spring 76. When the magnet is energized the arm 71 will be swung counterclockwise against the resistance of the coil springs 77, when the latch is moved to release position by any one of the lobes 74A equally spaced on the periphery of the cam 74 so that the error card can be guided into the bin 16 by the deflector blades 77A.

The drum shaft 56 (FIG. 2) carries a gear 78 which is driven by a gear train 79 in mesh with a pinion 81 fixed to the left end of the lower rearmost eject roll shaft 44. The drum rotates at a one to three ratio with respect to the card feed or picker knife cam 26 and at a one to six ratio with the feed rolls.

The lower feed roll shaft 44 for the intermediate feed rolls, disposed between the sensing stations, has secured to the extended left hand end thereof a magnetic pulse disc 82 the periphery of which is coated with a magnetically susceptible material. Three magnetic heads are arranged about the periphery of the disc; a pulse recording or write head 83, a pulse read head 84 and an erase head 85 reading counterclockwise in FIG. 2, which is the direction in which the disc 82 and the upper feed rolls rotate in unison.

Each of the sensing stations 51 and 52 are substantially identical in structure and a description of one will suffice. The first sensing means may be referred to as the reading station while the second sensing means may be referred to as the checking station. Each station consists of a unit including a brush carrier bar 86 of dielectric material, removably supported between the side walls of the frame. The bottom wall of the carrier disposed at an oblique angle, is slotted to hold eighty metal brushes spaced laterally to coincide with the spacing of the columns of the card. The banks of brushes 87 and 88, for the first and second sensing stations, respectively, extend beyond the lower edge of the bar to wipe the card and by applying voltage, sense electrically the perforations, row by row. Each bar 86 carries, at the forward center edge thereof, a casing 89 in which a lamp is housed to provide a beam of light for the operation of a phototube unit 91 used to detect the leading edge of the card as it passes through and breaks the beam, the tube and lamp combinations at the first and second sensing stations being referred to hereinafter as leading edge detectors 90 and 95 respectively. Both the phototube and the brushes are included in circuits, those of the brushes being energized when a brush, extending through a card perforation, wipes a metal contact strip 92 of which there is one corresponding to each column of a card at each sensing station. The strips 92 are embedded in a holder of dielectric material constituting a base plate 93 disposed beneath each sensing station and connected by wires 94 to a suitable board from the contacts of which wires are lead, in a cable, to a remote plug terminal. The phototube unit 91 is connected by wiring 98 to an amplifier, included in the circuit to be later described.

A tape unit is disclosed in application Serial No. 176,722, filed July 29, 1950, Welsh et al., now Patent No. 2,708,554 for Tape Drive and Recording Apparatus of the sort with which the present invention may be used, and in Patents 2,625,607 of January 13,1953 to J. P. Eckert, Jr., et al., and 2,686,100 of August 10, 1954, to J. P. Eckert, Jr., et al., there is disclosed a Pulse Recording Apparatus for recording magnetic information on a tape and reading information therefrom. It is not believed necessary to show the Uniservo or tape handling unit herein except to designate in block form a motor driven clutch means of an improved type that can control, very closely, the feed and retract movements of the tape and to show how a magnetic recording and reading head combination are employed in the circuit. The tape T (FIG. 8), upon which recordings in encoded form are made of the data read from the card after preliminary checking procedures, and from which the recordings may be read back for a further or final checking procedure, is driven by a capstan 30 rotatable in either direction by the clutch 35 operated by a suitable motor. The tape passes over the combination recording reading and erase head 40, so that the encoded data of the card, read the first time, is checked and recorded thereon in a binary code in accordance with the chart shown below. The construction and operation of the clutch are fully explained in a related application, Serial No. 515,064, filed June 13, 1955, in the name of Louis D. Wilson et al., now Pat. No. 2,868,340.

*Tape*

The tape prepared in the present device has the data recorded thereon at a pulse density of one hundred and twenty digits or characters per inch, and is recorded by blocks with approximately two and four tenths inches of space between. Each block includes six blockettes each of which, in the present converter, contain one hundred and twenty characters and are spaced approximately an inch apart. These spacings are inserted in such a way as not to interfere with the card sensing operations. Six blockettes make up a 720-digit block, the minimum information unit accepted by the computer. Each digit is represented on the tape by a code combination across the tape in eight channels, corresponding to the unit heads in the read-record head of the tape unit. Tape recorded for the computer is saturated magnetically in one polarity when a pulse is written and saturated in the opposite polarity in the space between pulses. A succession of pulses in the same channel results in approximately a 50–50 duty cycle of the two writing currents. The functional logic of the converter requires that the tape be moved to establish the spacings between blocks and blockettes; to feed the tape backward to make odd-even checks; to make checks to determine capacities of the blockettes of greater or less than one hundred and twenty characters; to record information read out of a memory after memory fill-in and to check information recorded on the tape against information read out of the refilled memory.

The function of the converter is to translate coded information on punched cards into Univac digits. The basis of the converter is the translation of the position code of the punched card system to the standard Univac code. The position code involves all twelve rows of the card. For numerical data the bottom ten rows are used. For alphabetic data the top three rows are used together with the nine lower rows to form 27 possible combinations. The alphabet requires 26 combinations; the 27th is used for a symbol.

While the converter senses the information on the cards, various checking circuits ensure efficient operation and detect mispunched cards. Unless a plugboard is set up for double reading, no more than two punches per row can be read in by the sensing circuits. Should the number of punched holes exceed two, the converter ceases operation until the operator reinitiates normal operation. The table below shows the conversion of eighty column punched card code into the code used in the computer referred to as "Univac."

| Punched Card Code, Row | Character | Univac Code | | |
|---|---|---|---|---|
| | | Channel: 1 | 23 | 4567 |
| 3 or 0 | Zero | 1 | 00 | 0011 |
| 4 | 1 | 0 | 00 | 0100 |
| 5 | 2 | 1 | 00 | 0101 |
| 6 | 3 | 1 | 00 | 0110 |
| 7 | 4 | 0 | 00 | 0111 |
| 8 | 5 | 0 | 00 | 1000 |
| 9 | 6 | 1 | 00 | 1001 |
| 10 | 7 | 1 | 00 | 1010 |
| 11 | 8 | 0 | 00 | 1011 |
| 12 | 9 | 1 | 00 | 1100 |
| 1 or Y | & | 0 | 00 | 1110 |
| 1+4 | A | 1 | 01 | 0100 |
| 1+5 | B | 0 | 01 | 0101 |
| 1+6 | C | 0 | 01 | 0110 |
| 1+7 | D | 1 | 01 | 0111 |
| 1+8 | E | 1 | 01 | 1000 |
| 1+9 | F | 0 | 01 | 1001 |
| 1+10 | G | 0 | 01 | 1010 |
| 1+11 | H | 1 | 01 | 1011 |
| 1+12 | I | 0 | 01 | 1100 |
| 2 or X | Minus | 0 | 00 | 0010 |
| 2+4 | J | 1 | 10 | 0100 |
| 2+5 | K | 0 | 10 | 0101 |
| 2+6 | L | 0 | 10 | 0110 |
| 2+7 | M | 1 | 10 | 0111 |
| 2+8 | N | 1 | 10 | 1000 |
| 2+9 | O | 0 | 10 | 1001 |
| 2+10 | P | 0 | 10 | 1010 |
| 2+11 | Q | 1 | 10 | 1011 |
| 2+12 | R | 0 | 10 | 1100 |
| 3+4 | / | 0 | 11 | 0100 |
| 3+5 | S | 1 | 11 | 0101 |
| 3+6 | T | 1 | 11 | 0110 |
| 3+7 | U | 0 | 11 | 0111 |
| 3+8 | V | 0 | 11 | 1000 |
| 3+9 | W | 1 | 11 | 1001 |
| 3+10 | X | 1 | 11 | 1010 |
| 3+11 | Y | 0 | 11 | 1011 |
| 3+12 | Z | 1 | 11 | 1100 |

Figure 4:
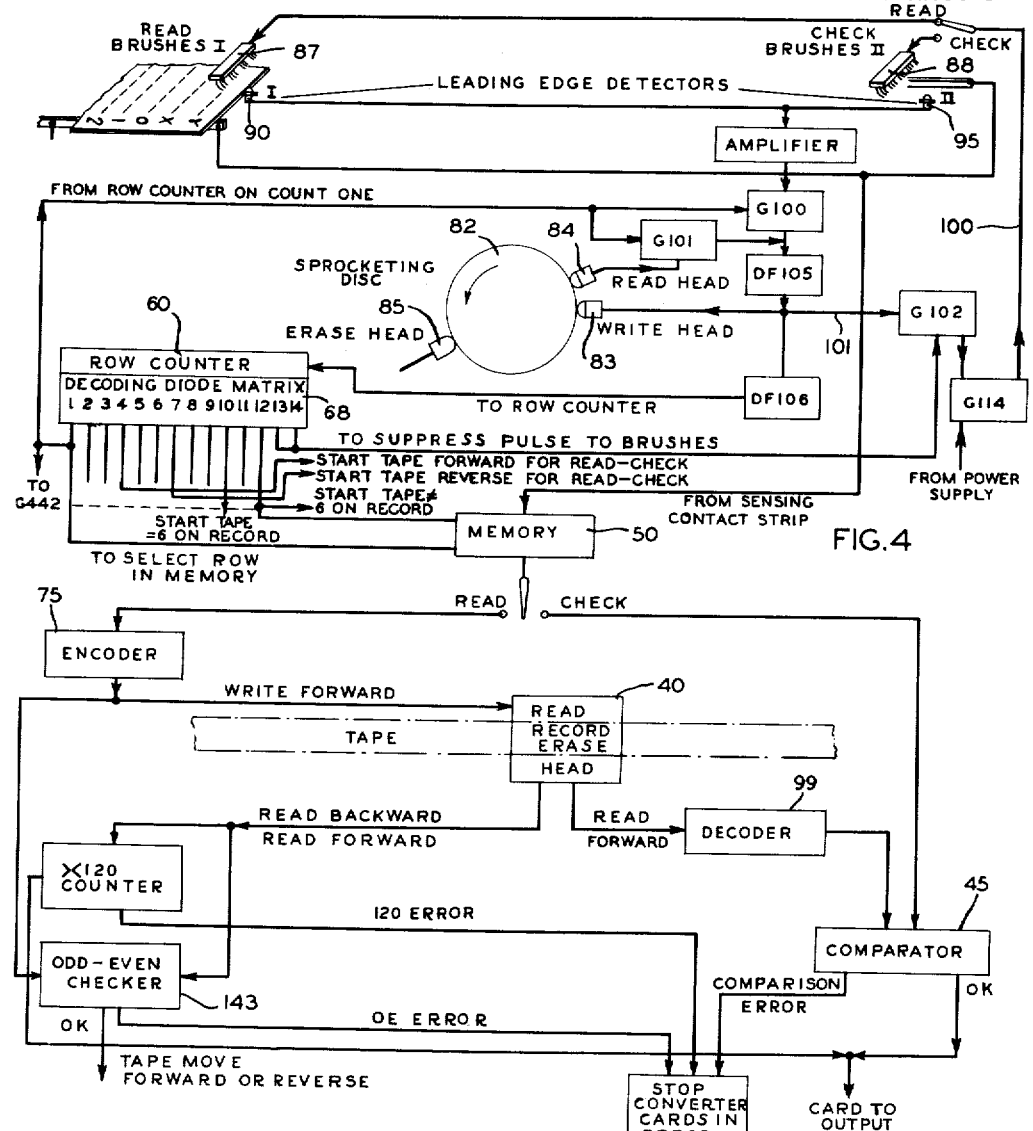
FIG. 4 is a diagrammatic representation of the technique carried out by the machine.

To determine the exact point in time for reading the data perforations of each row of a card as it passes under the brush, a sprocket system is used which can signal the sensing brush each time that a row is exactly thereunder. This sprocket pulse is generated directly by the leading edge photocell means, as no physical sprocket means appears on a punched card and the magnetic pulse disc 82, FIGS. 2 and 4 permits generation of a set of fourteen sprocket pulses, individually timed during the sensing of each card. The leading-edge pulse, obtained when the leading edge of a card cuts the light beam of the photocell unit, plays an important role in the conversion process. The entire function of card sensing and for filling in a memory depends on this pulse. The leading edge pulse energizes the common brush and steps a row counter from one count to another as each row of the card is fed under the common brush. However, the leading edge pulse is generated only once during each sensing operation of each card. If the pulse is to be the energizing agent on one hand and the stepping agent on the other, it must be recirculated each time a row of the card is brought under the brush and this is accomplished by the magnetic disc 82 which rotates continuously in synchronism with the feed rolls and which serves as the carrier of the pulse, receiving it and transferring it to a recirculation path. As a card enters the first sensing station 51 the leading edge detector unit 90 produces a pulse which is applied to the disc by the write head 83 and is carried to the read head 84 as the disc rotates counterclockwise (FIGS. 2 and 4). The time required about five milliseconds at 400 cards per minute or eight milliseconds at 240 cards per minute, represents the time it takes for the card to advance the distance between rows. The read head 84 picks up the pulse and sends it to the first sensing brush 87 in order to probe the contents of the first row now beneath said brush and also sends the pulse to the write head 83 so that a second pulse, corresponding to the second row of index positions in the card, will be recorded on the disc. The pulses recorded will be used for other purposes as will be later described. As each pulse recorded on the disc 82 revolves beyond the read head 84 it is erased by the erase head 85 to leave the surface of the disc clear to receive later sprocket pulses for other rows and other cards.

As the eleventh row "8" of the card is sensed, the tape T is started through a suitable transmitted signal and after the last row "9" or twelfth row of the card is sensed the card is passed to the second sensing station 52 where the same sprocket pulse controlled sensing procedure takes place. The tape handling unit is referred to hereinafter as the Uniservo or as the high speed tape transport unit, and the computer as the Univac. In the meantime the picker knife 21, FIG. 3, has completed one oscillation and begins to feed the next card to the first sensing station. After a card passes through the second sensing or checking station it is fed by the card stacking drum 57 into the output bin 61 unless an error has been detected as the result of checking procedures to be described, in which event the error-card ejector 64 operates to divert the feed of the card from the drum 57 into the error bin 16.

A memory unit 50 FIG. 4 shown in an application of common assignment Serial No. 515,062, filed June 13, 1955, in the names of J. Sims and W. Bartik, now Patent No. 2,978,681, contains upwards of nine hundred and sixty cells or coils, each of which stores a single binary digit. During transfer of the information from a card into the memory, a row counter 60 (FIG. 11) controls input gates in order to distribute the digits among the memory cells. The stepping pulses for the row counter are generated from the sprocket pulses. The row counter 60 and a column counter 55 (FIG. 13) are used to read out the information stored in the memory to recording circuits and in this instance the control is exercised through the plugboard 65 of well known type illustrated in FIGS. 5 and 12.

Figure 5:
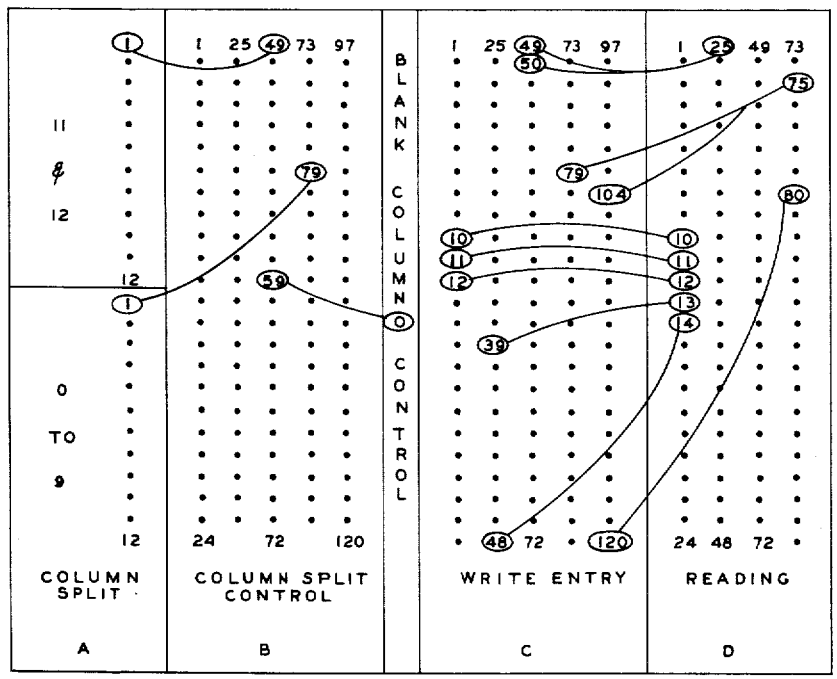
FIGS. 5 and 6 are views of the plugboard showing a typical, wiring arrangement.
Figure 6:
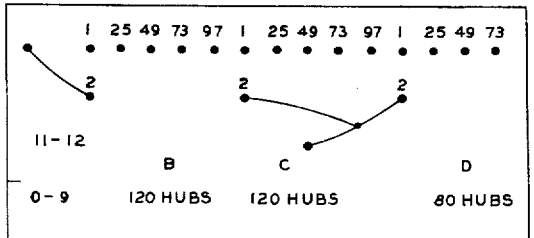
Figure 7:
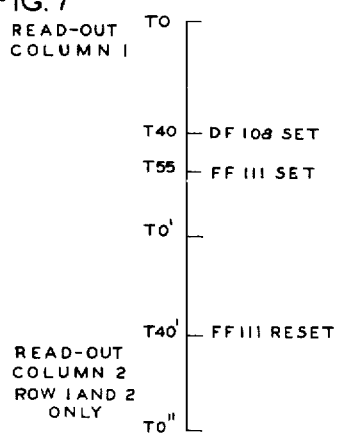
FIG. 7 is a timing cycle chart for split column read out.

The plugboard, FIGS. 5, 6 and 7, serves as a switchboard for the readout of the memory. By arranging the connections on the board, it is possible to rearrange information on the tape, so that it will appear in a different sequence on the tape from that on the card. Also columns may be split. In the ninety column IBM type card the twelve horizontal rows of data positions beginning at the top and reading downward are sometimes referred to as Y, X, 0, 1, 2, 3, 4, 5, 6, 7, 8 and 9 and it is possible with a hole in the "X" position and a hole in the "9" position to sense both holes but Y-wire or transfer the result of the sensing to two different places. This operation or function of a plugboard is well known, not only in the card sensing art as in the Y-wiring disclosed in Patent No. 2,580,693 and Patent No. 2,550,079 in which data from the same column on one card is located in different columns on another card to be punched (which is in effect the same as recording on a tape, either by punching or magnetic induction). In this instance a signal is put on the tape as the result of the sensing in the "X" position and adjacent thereto the sensing of the "9" position and this is eventually interpreted by the machine as a negative quantity. In the card the data of any column could be split if desired, that is, if the perforations stand for more than one character or symbol the pulse of the sensing means can place the characters or symbols in different columns in the memory unit and eventually in selected locations on the tape as they are read out by the operation of the circuit. This splitting is often done, if for instance, a negative number is to be indicated on the tape. A "–9" will be punched on the card with one hole in row 2(X) and one in row 12 (9). The column will now be split so that the X portion is read out first, and immediately following, the number 9 will be written on the tape. Finally the plugboard controls the shifting of the blank column control from space to zero or vice-versa. Normal read-out from the memory unit 50, FIG. 12, is controlled through the plugboard by connecting section D with C. This can be done in two ways; first, a one-to-one arrangement as shown in columns 10 and 11, so that the first 80 columns are plugged and the remain 40 unplugged; and second, the 80 columns from the card can be spread over the entire 120 digit space on the tape, as shown for columns 13, 14 and 80. Whenever a hole is not plugged a nil detector will supply that digit space with the Univac code combination for either space or zero. If it is desired to split column 25 into digit positions 49 and 50 with the X-Y portion being read out first, 25 on section D will be plugged to both 49 and 50 on C by means of a Y jumper. Position 49 on section B will be plugged to one of the 12 holes in section 11–12 (X-Y). The plugboard is arranged so that the part of a split column that is to be read out first is plugged up, although the circuitry actually inhibits the read-out of the opposite part of that column. Likewise, column 75 is split into positions 79 and 104, but this time the numerical section will be read out first. The blank-column control is plugged to 59 on section B. This means that with space/zero switch in the zero position any unplugged columns and any unpunched plugged columns up to and including column 57 will be filled with a zero on the tape, whereas from column 58 to 120 they will receive a space symbol. After each card the control is shifted back to its starting position. When it is desired to split a column, the plugboard must be wired whereby the column in section D is plugged into two positions in section C and another wire is connected from the position in section B that corresponds to the lower number of the two in section C to any of the 12 holes in section 11–12 or 0–9. The latter connection depends on which part is to be read out first. Although the plugboard is labelled so that the wanted information is plugged, an inhibition is actually placed on the opposite part of the column read-out. Likewise the column in which the split is to take place is plugged although the control is taken from the preceding column count. Consequently, no split can take place in column one.

In the conversion process the first check is the odd-even check which takes place during recording of characters on the tape. The check determines if the number of recordings in any one character position on the tape is odd or even. A second odd-even check takes place when the tape travel is set in reverse direction; at the same time, the number of characters entered on the tape is counted and a number greater or less than one hundred and twenty character recordings for each blockette is detected. Either check upon an error detection will stop the card feed and tape units. A third odd-even check is conducted when the tape is again set in the forward direction. In addition a comparison check and greater or less than 120 check is made, the number of cards converted is counted and mispunch circuits are provided for rejection of any cards having punched combinations that cannot be interpreted. If an error is detected, the card producing it is ejected into the error bin 16. When the card feed and tape units are stopped, the incorrect card may be reinserted at the bottom of the input magazine without further extraordinary manipulation of the controls.

Figure 9:
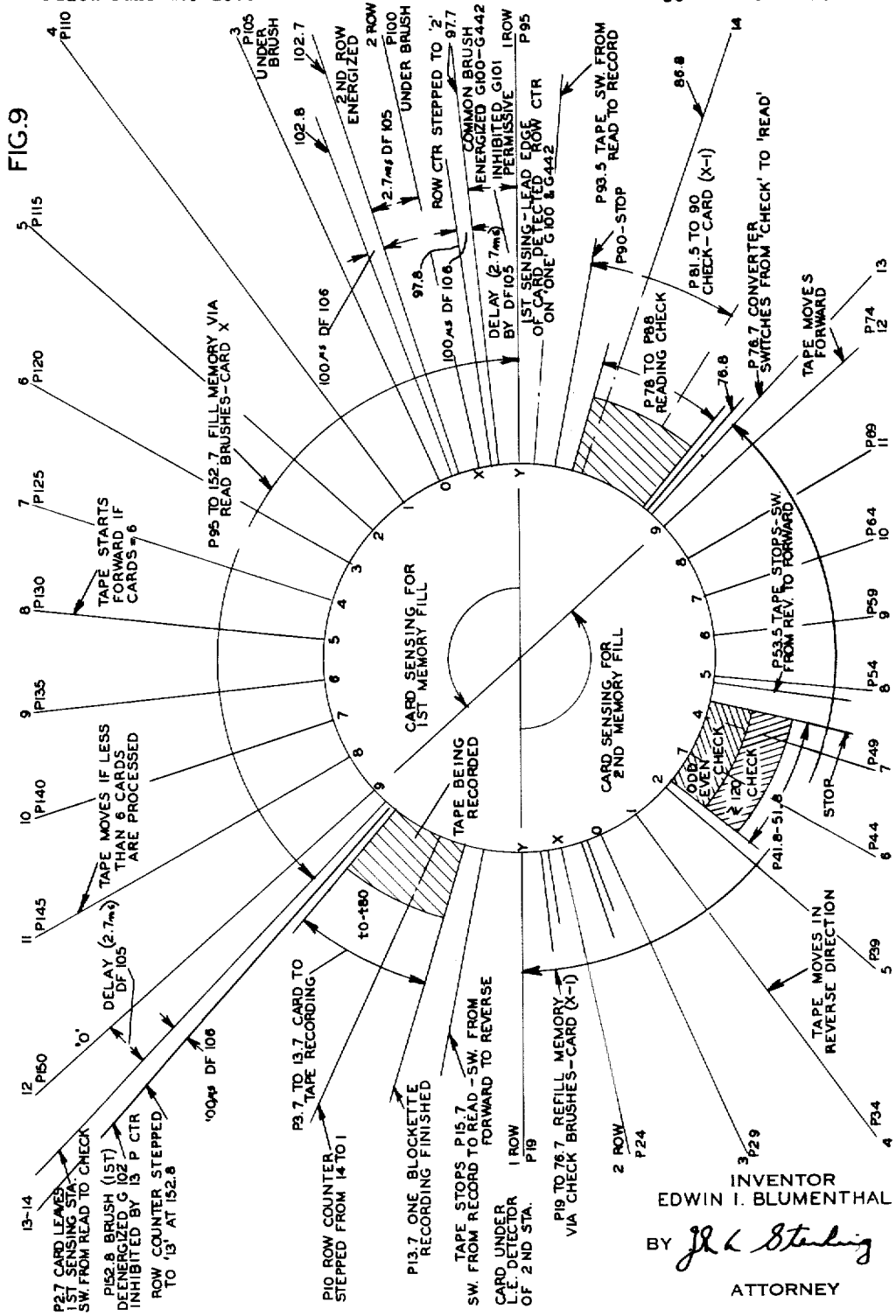
FIG. 9 is a pulse cycle chart showing the progressive operation of the machine.

For a more complete understanding of the method of operation of the invention, reference is made to the diagrams in block form, of the units used in the operation of the converter as illustrated in FIGS. 11 to 19, and to the pulse cycle chart of FIG. 9 in which $p$ represents the time in milliseconds and $t$ represents the time in microseconds. Generally, the operation begins with card sensing at $p95$ as the leading edge of the card breaks the light beam of the leading edge detector 90 of the first sensing station 51. The chart indicates an arbitrary position of $p0$ from which the pulse time cycle extends, this $p0$ position also coinciding with $p150$. All $p$ numbers are for a feed of 400 cards per minute. At 130 milliseconds ($p130$) the tape starts to move forward in order to place approximately 2.4" of space between blocks after six cards have been processed and the information thereon recorded on the tape. If less than six cards have been processed, the tape moves forward at $p145$ to insert a shorter space before recording the data of the next card. The twelfth row "9" of the card is under the brush of the first sensing station 51 at $p150$ and at this point the pulse time is arbitrarily brought back to $p0$. After a delay of 2.7 ms. the brush 87 of the first sensing station is desensitized and at $p152.7$ the brush 88 of the second sensing station is sensitized.

Figure 8:
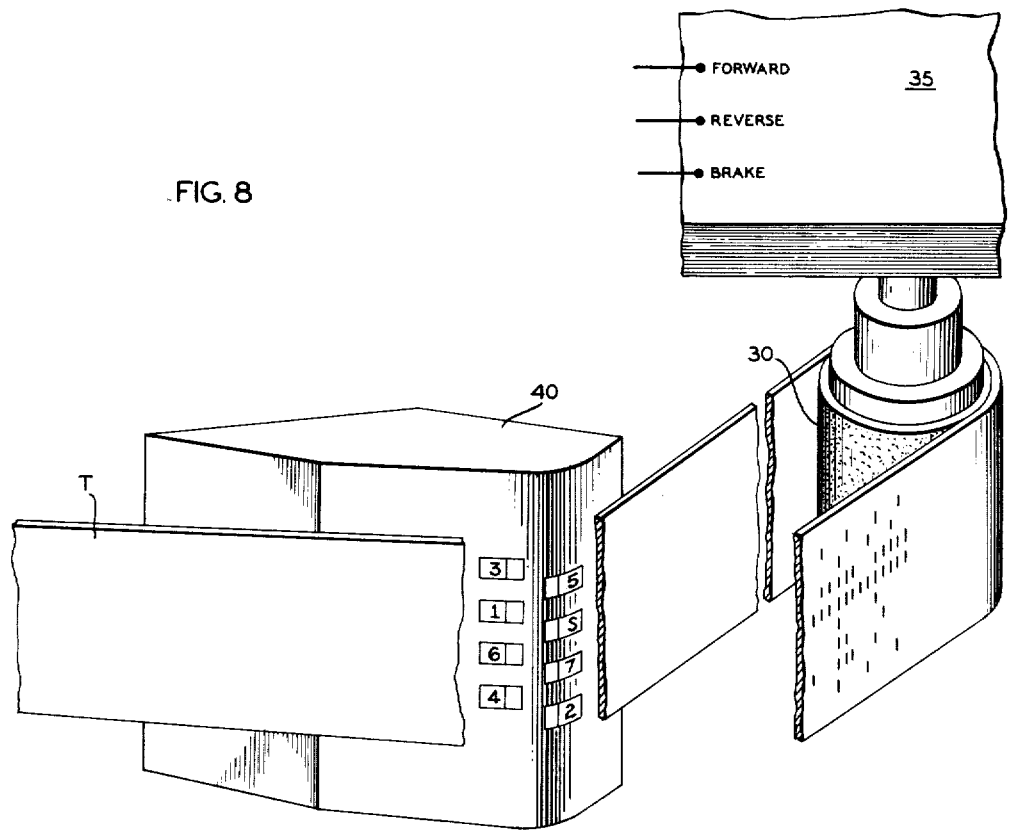
FIG. 8 is a fragmentary view in perspective showing the tape feed and the read, write and erase head.

At $p3.7$ the tape has attained uniform speed and information is recorded on it digit by digit, a complete blockette being recorded by $p13.7$. The tape stops at $p15.7$, the read-record head 40 in the Uniservo for the tape FIG. 8, is switched from "record" to "read" and the tape clutch 35, for controlling the tape operating capstan 30, is set from forward to reverse drive. At $p19$ the leading edge of the card is observed at the second sensing station 52 by the leading edge detector 95. At $p34$ the tape starts to move in reverse direction and reading from it begins. From $p41.8$ to $p51.8$ the odd-even and greater or less than 120 check is made. At $p53.5$ the tape stops and the tape controls circuits are switched from "reverse" to "forward" and the tape begins its forward movement at $p74$. The converter then switches from "check" to "read" at $p76.7$ and from $p78$ to $p88$ the information read out of the memory is compared with that recorded on the tape. At $p93.5$ the tape stops, the drive circuits remain in forward control condition, but the circuits for the head 40 are switched from "read" to "record" and the converter awaits information from the next card.

Figure 15:
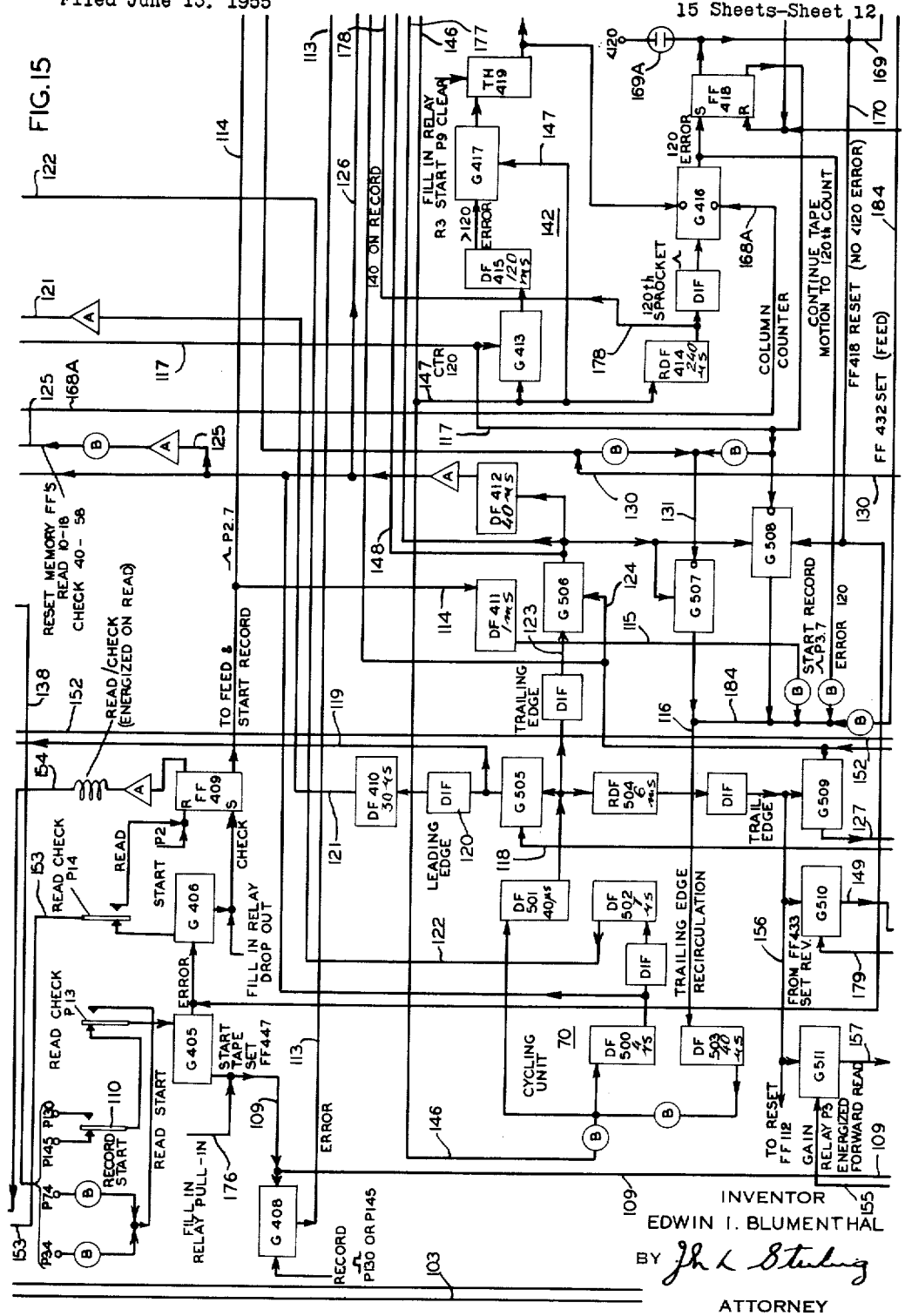

When a suitable clear-start switch on a control panel, not shown, is moved to start position, it restores the row-counter 60 and the column counter 55 to count one; energizes the read-check relays (FIG. 11) to "read"; connects the first sensing station 51 to the source of probing pulses; jam clears the memory; clears thyraflop TH419; fires the feed actuator thyraflop; and restores the flip-flops FF109 (FIG. 11), FF110, FF111, FF112, FF202—214 (FIG. 12), FF301, FF302 (FIG. 13), FF418 (FIG. 15), FF420, FF421 (FIG. 16), FF432, FF433, and FF434 (FIG. 15). When FF432 and 433 are restored, the tape drive circuits are prepared to move the tape forward and the read-record head 40 is conditioned for "recording." Meanwhile, the row counter 60, which is sitting on row one, places a permissive signal on the leading edge gate G100 and, through line 103, on the no card-filling memory gate G442. At the same time, over lead 102 the row counter places an inhibitive signal on the read-head gate G101. These two conditions prevail until the leading edge of a card comes under the leading edge detector 90 of the first sensing station 51. Once the leading edge of the card is detected, card sensing and memory fill-in begin.

*Leading Edge Pulse*

At $p0$ a card is fed by the picker 21 from the bin 17 to the first pair of feed rolls 47, 48. Ninety-five milliseconds later at $p95$ the leading edge of the card reaches the detector 90 and the first row (Y) of the card reaches the brush 87 of the first sensing station at the same time. At $p95$ detector 90 (FIGS. 3 and 11) initiates a pulse which is amplified and fed to gate G100 which is open and permits the pulse to pass to a 2.7 ms. delay flop DF105. The latter has a threefold purpose. Its static output signal (1) energizes the brush 87 of station 51 during the sensing of each row (2) energizes the recording or write head 83 of the magnetic pulse disc 82 to record the leading edge pulse, while a differentiated output pulse (3) steps the row counter 60 at the completion of sensing of each row. After the pulse has been recirculated fourteen times the path is closed and remains closed until the leading edge of the next card cuts the light beam of the photocell.

The brush pulse and write head circuits 100 and 101, respectively, FIG. 4, receive the 2.7 ms. pulse simultaneously. The brush pulser gate G102 allows the pulse to pass and energize the brush 87 during the sensing of each row. In order to provide ample time to probe the entire length of any punched hole in a row, the brush must remain energized for the entire period of the 2.7 ms. pulse. The write head 83 requires only the leading edge of this 2.7 ms. pulse in order to duplicate the initial leading edge pulse during each recirculation cycle and the pulse is therefore differentiated into a peaked pulse. The write head 83 energized by the peaked pulse, records a sprocket pulse on the magnetic drum or disc 82 which is read off by the read head 84 it energizes the latter which transfers the pulse to the read head gate G101. The gate G101, inhibited by row count one through line 102, withholds the pulse, but as soon as the row counter is stepped from count one to count two, gate G101 becomes permissive and passes the read-head pulse to the delay-flop DF105 for recirculation. Two gates, G102 and G114, form the path for the pulse. Gate G102 permits the 2.7 millisecond pulse from DF105 unless the row counter is on either count thirteen or count fourteen. On either of these two counts the row counter sends a signal to G102 that prohibits the passage of the 2.7 millisecond pulse. The second gate of the circuit, G114, receives the 2.7 millisecond pulse from G102 and, alerted by a signal from the pulse power supply, passes the pulse to energize the common brush.

*Row Counter*

The row counter 60, FIGS. 4 and 11, uses only the trailing edge of the 2.7 millisecond pulse from DF105 to step from one count to the next. The trailing edge is elected in order to allow enough time for the common brush to probe a given row and send sensed information to a corresponding row in the memory 50, and the write head 83 to record the sprocket pulse on the magnetic commutator drum 82. The 2.7 millisecond pulse is differentiated and its trailing edge fed to DF106, FIGS. 4 and 11. The delay flop holds the peaked pulse for one millisecond to permit the common brush and the write head to complete their functions, then sends it to step the row counter 60. With the stepping of the row counter, the leading edge of the next row on the card comes under the common brush. Also, G101, which becomes permissive when the row counter is no longer on count one, admits the read-head pulse and passes it to trigger DF105. From DF105 the pulse is sent to activate the write head 83 the common brush, and the row counter as just described. The "leading-edge" gate, G100, closes when the row counter is stepped from count one and prohibits the passage of any pulse until the row counter returns to count one. The stepping of the row counter continues until card sensing is completed. Then, the counter returns to and remains on count one as long as no leading edge pulse or any other pulse is introduced into recirculation on the magnetic commutator drum 82. When the drum once again recirculates successive pulses, the row counter cycle is repeated in the manner described. The row counter 60 consists of four binary counters which may produce as many as 16 outputs. The converter, however, requires only 14 counts. Therefore, two counts must be deleted. Deletion of the two counts may be arbitrarily undertaken at any time; but, in this instance, the circuitry of the row counter 60 is designed so that deletion is best accomplished after row count six. Once deletion of the two counts is completed, the counter 60 resumes the counting operation until it is once more set to count one. The binary code assigned to count one and succeeding counts is as follows:

| Row Count | Binary Code | Row Count | Binary Code |
|---|---|---|---|
| 1 | 0010 | 7 | 1010 |
| 2 | 0011 | 8 | 1011 |
| 3 | 0100 | 9 | 1100 |
| 4 | 0101 | 10 | 1101 |
| 5 | 0110 | 11 | 1110 |
| 6 | 0111 | 13 | 0000 |
|  |  | 14 | 0001 |

The state of the binary counters during row count can be determined by following the binary code assigned to each row count. A binary counter with have a 0 or 1 output according to the code of the particular row count. Each time the row counter is stepped, it energizes the horizontal core line of a corresponding row of the memory 50. By this time the brush has sensed each column of a given row and has transferred the source data to corresponding vertical core windings of the associated row of the memory 50.

The read-head gate G101, FIG. 4, must stay closed as long as the row-counter reads one but it must open after the counter steps to two. This is done to prevent recirculation of undesirable pulses recorded on the drum 82. Once the counter is stepped, gate G101 can stay open as consecutive rows of the card pass the sensing brush 87 and while it stays open the read-head 84 recirculates thirteen consecutive pulses, eleven during the card sensing operation and two to inhibit the brush pulser gate G102 as the trailing edge of the card leaves the sensing station as will be later referred to. The delay-flops referred to herein are a source of rectangular gating pulses used as delay circuits as in a Univibrator of the type fully disclosed on page 87 of Electronics; Experimental Techniques by Elmore and Sands, McGraw-Hill Book Co.

Sensing Operation

At *p*97.8 the counter is stepped to count two and by this time the brush 87 has sensed each column in the first row of the card and has transferred the sensed data to corresponding vertical core windings of the magnetic memory unit 50 while the row counter has energized the horizontal core windings of row one. Subsequent leading edge pulses recirculate in the same manner as the initial pulse. The particular type of memory unit is shown and described in another application of common assignee, Serial No. 515,062, filed June 13, 1955, now Patent No. 2,978,681. The second row of the card comes under brush 87 at *p*100. At the end of 2.7 ms. delay by DF105, the brush is energized. At *p*102.8 at the end of 100 μs. delay by DF106, the row counter is stepped to three. In like manner each row comes under the brush 87 at every 5 millisecond increment until the twelfth row comes under the brush at *p*150 (*p*0). At the end of 2.7 ms. (*p*152.7) delay by DF105, the brush is energized. At *p*152.8, at the end of 1 ms. delay by DF106, the row counter is stepped to thirteen. The gate G102 is inhibited by the thirteenth pulse of the row counter and the brush 87 is deenergized at *p*152.8. At *p*152.7 (2.7) the first card sensed, is nearing the leading edge detector 95 of the second sensing station 52 and at *p*152.8 (2.8) the row counter is stepped to fourteen. From *p*3.7 to *p*13.7 recording on the tape takes place and at *p*10 the row counter is stepped from fourteen to one.

Memory Input

While the card is being sensed, the information is read into the memory unit 50 and the tape T, FIG. 8, is set in motion. The memory input circuit is shown in FIGS. 4, 11 and 12. Each time the row-counter 60 is stepped it transfers the count to a diode matrix 68 whose twelve output lines are connected to read-check relays RC1 to RC12 respectively. The term "read" as used herein, refers to the transmission of information into the memory unit 50, FIG. 12, from the first sensing station 87 while "check" refers to the transmission of information out of the memory unit to be compared with information from the second sensing station 52. When the start switch is first pushed down, the read-check relays are energized to "read" and with the relays in this position as illustrated, the counter outputs can be transferred one by one, to energize horizontal wires the rows of the memory which correspond to the rows being sensed in the card. Each time a pulse leaves the matrix 68, FIG. 11, the relay corresponding to the row passes the pulse from the matrix to one of the twelve memory input gates G103A–G103L. Each of these gates corresponds to a row-count; is normally closed, and is provided for the purpose of allowing the row counter pulse to pass whenever the counter 60 is stepped and the brush is energized. It is evident that a permissive signal must open the input gates, not one by one, but simultaneously as the brush is pulsed. This requirement indicates that the gates must remain open for 2.7 ms. The output of G102 is used to perform this function and its output signal simultaneously pulses the brush and opens all twelve of the memory input gates during the sensing of successive rows of the card. Each horizontal row wire in the memory unit 50 is thus energized. The brush, meanwhile, energizes the vertical wire of a given column if the brush senses a hole in that column and the coincidence of column and row inputs records a binary digit in the selected cell of the memory. After all twelve rows of the card are sensed, and the information is delivered to the memory unit the latter holds the information until memory read-out signals are applied to various circuits.

Tape Transport

The stored information is next transferred from the memory to the tape which is set in forward motion before the sensing operation is finished. The circuits in the Univac input synchronizer require a space between blocks of information to permit starting and stopping the tape transport mechanism represented herein by the clutch 35 and its associated parts. The space between blocks is 2.4" and between blockettes the Univac can accommodate any desired spacing as explained above. At the moment only two functions of the converter are considered (1) acceleration and deceleration of the tape before and after information is recorded thereon in blockette units and (2) the additional time allowed after six blockettes have been recorded to place 2.4" of blank space between blocks on the tape. Before the first card of a blockette is recorded, the tape is started at *p*130 (FIG. 8) and for each succeeding card or blockette, the tape is started at *p*145. The earlier starting of the tape for card number one inserts the 2.4" of blank tape between blocks whereas a space of about one inch is left blank between the other five blockettes. By *p*3.7 the tape has attained uniform speed and recording of information begins. When the tape starts to move at *p*145, the eleventh row of the card is under the brush and the 2.7 ms. pulse obtained from DF105, FIGS. 4 and 11, passes through G102 over line 108 and opens all the output to memory gates G103A–G103L. The row counter being on count eleven, and the corresponding input gate G103K being open, the eleventh row of the memory is alerted and at the same time the brush energizes corresponding columns of the row in the memory unit.

A pulse is needed to set FF447, FIG. 18, and to place a slow erase current on the read-record head 40 of the tape, which current must be present for 19 ms. to erase any previous recording. At p145 two circuits must be activated before data is recorded on the tape; one to start and the other place an erase current on the read-record head. The only pulse that energizes the above two circuits at this time is the 2.7 ms. pulse obtained at the output of G103K. The output of this gate is applied to card counter "one" relay 110 (FIG. 15). During the sensing of the latter five consecutive cards of a blockette, the relay transfers at p145 the 2.7 ms. pulse, by way of pole 13, FIG. 15, of the read-check relay to gate G405. The gate prevents the start signal from passing whenever an error occurs during card feed; otherwise, the gate remains permissive. The pulse at p145 passes through G405 and its output through line 109 FIGS. 15, 17 and 18, sets FF447 and also passes through gate G408, FIG. 15 which is made permissive by a "record" signal from the tape unit. Once FF447 is set, the tape begins to move forward. Gate G408, opened by the record signal from the tape unit, permits the pulse to pass through to fire a thyratron 111 FIG. 16 by way of line 113 FIGS. 15 and 16 and DF422 (FIG. 16) triggering DF422. The thyratron 111, once fired, places an erase current on the read-record head 40. The pulse is delayed for 8.2 ms. in order to allow the tape to attain full uniform speed and the erase current is not applied until the tape has reached full speed in order to avoid recording harsh pulses. At the end of the delay, DF422, FIG. 16, fires the thyratron 111 and places a slow erase current on the head. There are two thyratrons in the erase circuit, one, 111 supplies the erase current and the other 112, FIG. 16, shuts it off when the tape has stopped.

The purpose of the slow application of the erase current to the recording head and the subsequent slow removal of the current is to prevent transients from being recorded, which on playback or "reading" would give spurious pulses. If the erase current is applied and removed slowly, and if the playback circuits are provided with a high pass filter the signals produced by the application and removal of the erase current will be suppressed. If the erase currents are applied and removed abruptly, the magnetic transients so recorded will be played back as pulses. Thus, at the start of a recording operation, the erase current is gradually increased until it reaches its full operating value, at which time the recording signals are applied to the head. Similarly, at the end of the recording period the erase current is gradually decreased to zero. The time for increase and decrease of the erase signal is chosen so as to be long compared to the pulse period. As an example, when the machine is converting data at the rate of two hundred and forty cards per minute, about twelve and one half milliseconds is allowed prior to and after recording for the build up and decay of the erase currents.

By the time the tape has reached uniform speed, the row counter 60 is stepped to "twelve" and at p150 (p0) the twelfth row (9 position) of the card comes the brush. At the end of 2.7 ms. delay, timed by DF105, FIGS. 4 and 11 (at 152.7) the row counter is stepped to "thirteen" and by this time all twelve rows of the card have been sensed in the first sensing station and the flip-flop FF409, FIG. 15 is now set. As the latter is set, the "read-check" relay is deenergized and its pole p14 (FIG. 13) switches the circuit to the brush 88 of the second sensing station 52. Although all twelve rows of the card have passed under the brush, the twelfth row has not come under the leading edge detector 90 FIG. 4 as there is an eighth of an inch space between the trailing edge of the holes in the last row (9) and the trailing or bottom edge of the card.

*Trailing Edge Suppression*

If the twelfth row of the card has a hole punched directly in the column corresponding to the leading edge detector 90, the latter would initiate a leading edge pulse. If the row counter 60, FIG. 4, were returned to "one" after the twelfth count, gate G100, FIGS. 4 and 11, would be open or permissive and gate G101 would be closed or inhibited as at the start of card sensing at p95 when the row counter was sitting on "one." Consequently, the leading edge pulse would trigger delay flop DF105 and the 2.7 ms. signal would step the row counter, would start card sensing before p19, and would interfere with the memory read-out. In order to prevent the triggering of DF105, the row counter must not be returned to count "one" immediately and the brush pulse gate G102, FIGS. 4 and 11, must be inhibited until the trailing edge of the card has safely passed the leading edge detector 90. The row counter 60 has counted up to twelve and since it is stepped about every 5 ms., two extra pulses would be sufficient to inhibit the gate G102 as the trailing edge of the card leaves the leading edge detector 90 and as information is recorded on the tape. At p152.8 the row counter is stepped to "thirteen" and as the leading edge of the thirteenth pulse rises it is applied to G102. The gate remains closed during counts "thirteen" and "fourteen" and during this time gate G100 is also held closed prohibiting any false signals while G101 is kept open thus recirculating the pulses "thirteen" and "fourteen." The last two counts "fifteen" and "sixteen" are deleted. After count "fourteen," or at p10, FIG. 11, the row counter is returned to count "one" and remains there until the leading edge of the card comes under the leading edge detector 95, FIG. 4 of the second sensing station 52. During count "one" G100 is open and G101 is closed, the latter to keep any pulse, accidentally recorded on the magnetic drum 82, from interfering with card sensing. Up to the present the main objective has been to transfer encoded data to the memory unit 50 and by p152.8 the memory is completely filled and waits to distribute its contents whenever read-out signals occur.

*Memory Read Out*

Memory fill-in is row wise and memory read-out must be columnwise. The alphabetical and numerical codes are encoded into the seven bit Univac code shown herein. One column read-out represents one digit in a blockette and there are one hundred and twenty digits in a blockette. The memory contains only eighty column read-outs so that forty nil or fill digits must be supplied to complete the number of digits in one blockette, except in the case of column split operation in which some of the columns of the card are double punched and are recorded as two separate items on the tape as hereinbefore referred to. The fill digits are supplied by the column counter 55 (FIG. 13) and the forty fill digits are determined by a timing circuit which clocks the application of various read-out signals to associated memory read-out control circuits. The circuit which satisfactorily times the distribution of read-out pulses is the cycling unit circuit 70 shown in FIG. 15.

When the row counter is stepped to the fourteenth count, the tape begins to move forward and in the meantime the 2.7 ms. pulse from FF409 triggers DF411, over lead 114, which delays the pulse for 1 millisecond. This delay gives the memory amplifiers 71 (FIG. 12) enough time to recover when the row bias in the memory is shifted to memory read-out. At 3.7 ms. after a delay of 1 ms., the pulse enters the recirculation path of the cycling unit at t0. In order to distinguish cycling unit time from card sensing pulse cycling time, represented by "p," use is made of "*t*" preceding the pulse time used in the cycling unit. The recirculation pulse then triggers DF503, through lines 115—116, and is delayed for 40 μs. At *t*40, at the end of the delay, a peaked pulse triggers DF500 and DF501 (FIG. 15) and from this point on, the cycling unit 70 distributes read-out signals to associated circuits. The recirculation path is gated by G507 and G508. During the recirculation of the read-out pulse, on record, G507 is open and it is closed when the column counter 55 sends a pulse over lead 117 during the one hundred and twentieth count gated by G403, FIGS. 12, 13 and 15. This pulse also closes G508 and recirculation of the read-out pulse stops. Normally the recirculation path is open when G507 is open, as long as the one hundred and twentieth count signal is absent. The gate G508 is kept open on record by a no "not less than one hundred and twenty" error pulse which is obtained from the restored output of FF418, FIG. 15. One complete recirculation takes place in 80 μs.

The Column Counter

Initially the column counter 55, like the row counter 60, is on count one (FIG. 13). Assuming that the plugboard 65, FIG. 12, is set up to read-out in the normal consecutive numerical order, of the card columns, the counter has already signalled the memory to read-out column one. The memory, however, cannot because the associated memory output circuits have not received read-out signals. The cycling unit is then stepped by a 3.7 ms. pulse and distributes memory read-out signals according to their logical order of function. The output of delay flop DF503, FIG. 15, which is arbitrarily timed as *t*0, simultaneously triggers DF500 (25 μs.) and DF501 (40 μs.). Logically, the first memory read-out circuit to be alerted by the cycling unit is that consisting of the gate memory amplifiers 71 (FIG. 12). The output of DF501 is simultaneously fed to two gates and one retriggerable delay flop, G505, G506, and RDF504 respectively. Gate G505 is made permissive by the record pulse from the restored output of FF432, FIG. 17, over line 118, which output is a 40 μs. wide pulse (*t*0–*t*40) used to open column counter output gates G104A–G104X over lead 119 (FIGS. 12, 13, 15). The same 40 μs. wide pulse is differentiated at 120 and its leading edge pulse triggers a 35 μs. delay flop DF410, the 35 μs. output pulse of which is amplified and applied to the gate memory amplifiers 71, FIG. 12. The gates remain open for 35 μs. and during this period a column of the memory 50 is read-out. The RDF504, FIG. 15, is flipped by the *t*0–*t*40 pulse but the duration of the latter is not sufficient to completely fire the thyraflop. It needs a longer pulse to cause it to fire and for the present, then, it is merely hit by the 40 μs. pulse. The output of the gate memory amplifiers 71 is fed to the gates G200A–G200L (FIG. 12) which are normally closed. They can be opened only when a sampling pulse is applied to them over line 122 and this pulse is obtained by having the *t*0 pulse from DF503 trigger DF500, the output of the latter being differentiated and the trailing edge of the *t*25 pulse being used to trigger DF502 (FIGS. 12 and 15).

It is necessary to remember that read-out from the memory is controlled by the cycling unit during its 80 microsecond recirculating time. From *t*0 to *t*40 the output from the column counter is gated through G104A–X which then controls the read-out of the memory via the plugboard FIGS. 5 and 6. The output signals from the memory are gated so that only from *t*25 to *t*30 do these set the respective FF202–FF214, FIG. 12. A column split in column 2 with read-out of X-Y first will take place as follows: from t0 to t40 column 7 read-out takes place. At *t*40 this read-out terminates by the column counter being stepped to two and by the alerting signal on G104A–X being removed. *t*40 also trips DF108 through the split column wiring. After 15 microseconds delay, *t*55, DF108 recovers and sets FF111, which in turn alerts the row drive tubes for row 3–12 inhibiting read-out from these memory rows. From *t*0' to *t*40' when read-out from column two takes place, only information in row 1 or 2 will be read out. At *t*40' the column counter is again stepped and FF111 reset, terminating this part of the split operation. The remaining information in column two will be read out when the column counter reaches that number to which the split wire in section C is plugged.

Encoder Input Circuits

The output of DF502, FIG. 15, (*t*25–*t*30) opens the gates G200A–G200L through line 122. It requires 5 μs. for the information to pass through the gates, the output of the latter of which sets flip-flops FF202–FF214, FIG. 12, which transfer the information, after amplification to an encoding function table 75 (FIG. 13). The flip-flops must be restored after the information has passed through them and this is done at the same time that the encoding table output gates G201A–G201G are open. The *t*40–*t*80 pulse performs both functions. The encoder 75 translates the information into the Univac code and once the information is encoded, the cycling unit 70, FIG. 15, sends a 40 μs. pulse to reset FF202–FF214 and to open the encoder output gates G201A–G201G. This pulse originated at the output of DF501 which is differentiated and the trailing edge of the *t*40 pulse is fed via line 123 to gate G506, FIG. 15. This gate is permissive as long as FF432, FIG. 17, connected to it through lead 124, is set to "record." The output of gate G506 is fed to DF412 and the peaked pulse is converted to a 40 μs. wide pulse which is amplified and fed to FF202–FF214 over line 125, FIGS. 12 and 15, and to the "write" gates G201A–G201G via line 126, FIGS. 13, 15 and 16, and which pulse lasts from *t*40 to *t*80. The gates G201A–G201G are opened and the encoded information passes to the read-record heads 40, FIG. 13, for writing on the tape. As shown in FIG. 13 the read-record relays for the heads 40 are at the "read" position. As the tape attains uniform speed the information is recorded on it by the read heads, the cycling unit 70 recirculating eighty times in order to supply read-out signals for reading out the entire memory columnwise. The recirculation path remains open as long as no errors are detected. The fill-in pulses from the plugboard are also introduced into the encoding function table 75 where they are encoded and then recorded on the tape. The arrangement of the nil and information pulses coming into the encoder depend upon the wiring of the plugboard as will be later explained.

Figure 14:
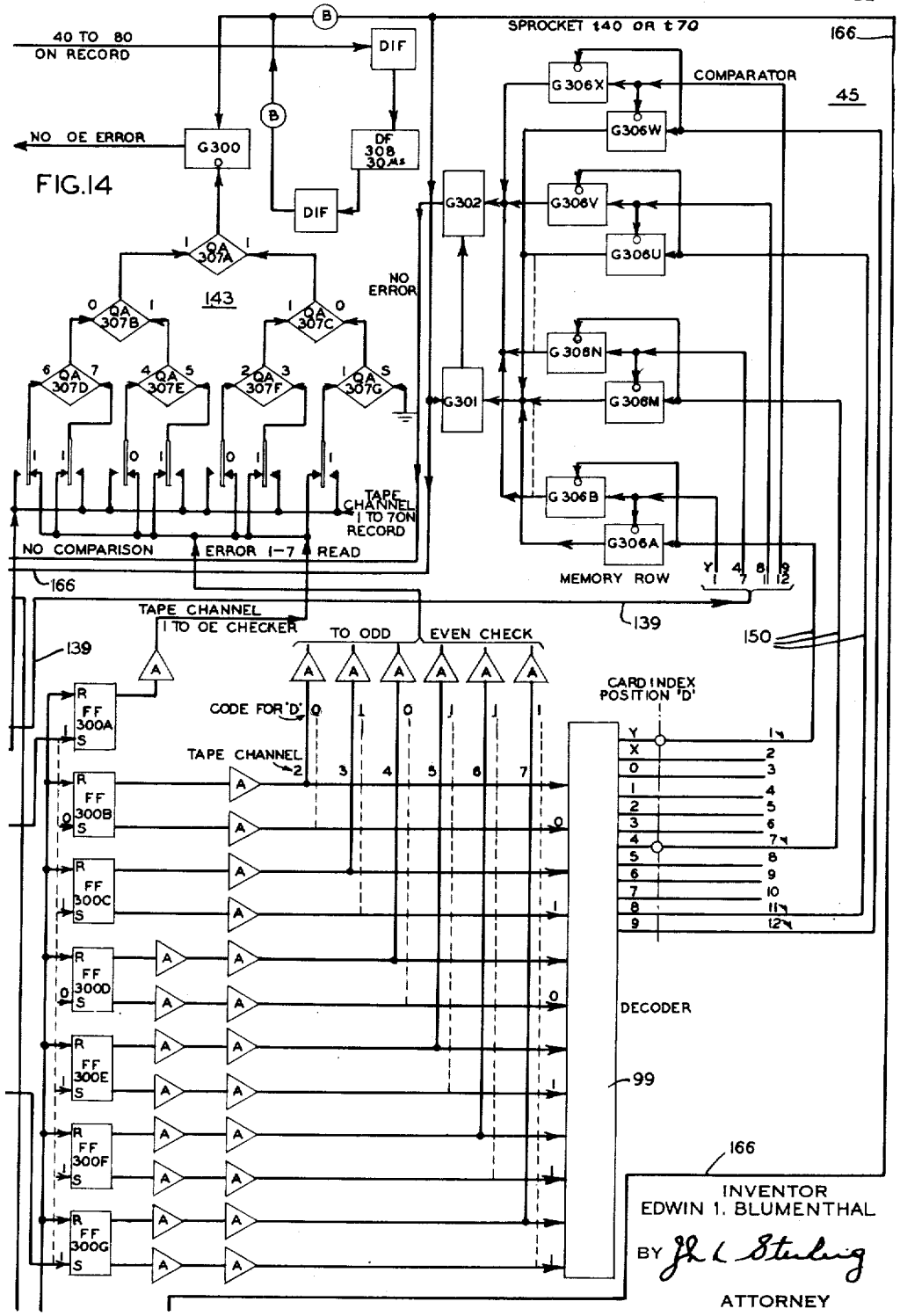

As each digit is encoded, it is sent to the read-record head and to an odd-even checker 143, FIGS. 4 and 14. The odd-even checker investigates the presence of ones with the digit; in the meantime each channel of the digit energizes a unit head of the read-record head. The polarity of each unit head determines whether a one or a zero is to be recorded on tape. After recording of each digit, an erase current is applied to the read-record head so that no unnecessary pulses are present. The recording of digits continues until 120 digits have been placed on the tape. If no odd-even error is present, conversion process continues. From here on, until the next recording process, the purpose of the read-record head is to read information from the tape during the various checking operations.

The Cycling Unit

At *p*13.7 a blockette is recorded on the tape and 2 ms. later at *p*15.7 the tape is stopped. The tape control circuits are then switched from "record" to "read" and from forward to reverse position. The output of G509, FIG. 15, supplies the pulse, through leads 127 and 128, and FF447, FIGS. 6, 15, 17 and 18, to the break coil of the clutch which stops the tape. As above noted RDF504 was hit during each column read-out of the memory. At p15.7 the pulse lacks about 2 ms. which is long enough to fire the thyratrons. The output of RDF504 is differentiated and fed to G509 (FIG. 15). Since FF432, FIG. 17, is still restored, its output from the restored side is routed to G509 via line 124 and the combination of pulses from FF432 and RDF504 keeps G509 open. The latter gate permits a pulse which at p15.7 is applied to G428, FF432, FF433, FIG. 17, and FF447, FIG. 18. Since there is no fill-in at this time the gate G428, FIG. 17, stays closed and the remaining three flip-flops receive the same pulse simultaneously at p15.7. At p15.7 FF432, which until now has been placing a permissive signal on the gates G509 and G506, receives the output pulse of G509 over leads 127, 128 which sets FF432 whose set output places a permissive signal on G436 through line 129 and an inhibitive signal on G507 through leads 130, 131, FIG. 15. This closes one of the recirculation paths of the cycling unit 70. The other path of the unit is through gate G508, FIG. 15, which is also closed by a pulse from the column counter applied only when the column counter is on count "120" through leads 47 and 117, as above noted. The flip-flop FF432 is set to "read" and G436 is made permissive by pulses coming from the set side of FF432 (lead 129) and restored side of FF433 (lead 132, FIG. 17). The output of G436 energizes the gain relay 133. On "read" FF432 thus closes G509 and opens G436. The output of gate G509 at p15.7 restores FF447, through leads or lines 127 and 128, FIGS. 17 and 18, which flip-flop places a pulse on the brake coil of the tape control clutch 35 (line 134, FIG. 18), and an inhibitive signal on the gate G400 through line 135, FIGS. 16 and 18. This pulse closes G400 making it impossible to step the cycling unit circuit 70 and the pulse also energizes the brake coil of the clutch 35 to stop the tape.

At p15.7 the output of G509 is again fed to the set side of FF433 through lines 127, 128 and the set output of this flip-flop places a reverse-tape signal on the gate G454 over the line 136, FIGS. 17 and 18. This gate, however, is closed until a permissive signal arrives from the set side of FF447 via lines 127 and 128. The output of G454 energizes the reverse drive coil of the tape clutch 35. This permissive signal is withheld until it is time to read and check the blockette. Meanwhile the card has been moving toward the second sensing station 52.

*Second Sensing*

At p2.7 the card leaves the first sensing station. The flip-flop FF409, FIG. 15, restored by a pulse from the row counter 60 at p2.7, deenergizes the read-check relay so that its pole 14 neutralizes the brush 87 of the first sensing station and sensitizes the brush 88 of the second sensing station 52, FIG. 13. While the data from the memory unit 50 is being recorded on the tape, the card is advanced by the feed rolls to the second sensing station and the leading edge of the card comes beneath the leading edge detector 95 of the second sensing station at p19 or 3.3 ms. after the tape has been stopped. Once again an initial leading edge pulse appears at G100 and the recirculation path of the magnetic pulse disc 82 is opened. From this point on the card is sensed a second time in very nearly the same manner as it was the first sensing station with a few variations which will be later explained.

In order to ensure that each cell of the memory unit 50 is operating properly, the rows of the memory are energized in a different order, during the second reading, than they were during the first sensing or reading. The read-check relay poles 1–12 are deenergized during the second reading so that the row count is not transferred by the same poles as used previously. The poles are so arranged that row counts are transferred to the rows of the memory in the manner shown below so that at any time any one of the cells is not functioning properly, it can be detected during comparison check.

| Pole | | Memory |
|---|---|---|
| 1 | passes count 1 to G103B energizing | row 2 |
| 2 | passes count 2 to G103A energizing | row 1 |
| 3 | passes count 3 to G103D energizing | row 4 |
| 4 | passes count 4 to G103E energizing | row 5 |
| 5 | passes count 5 to G103F energizing | row 6 |
| 6 | passes count 6 to G103G energizing | row 7 |
| 7 | passes count 7 to G103H energizing | row 8 |
| 8 | passes count 8 to G103I energizing | row 9 |
| 9 | passes count 9 to G103J energizing | row 10 |
| 10 | passes count 10 to G103K energizing | row 11 |
| 11 | passes count 11 to G103L energizing | row 12 |
| 12 | passes count 12 to G103C energizing | row 3 |

*Odd-Even Check*

Odd-even check takes place concurrently with the recording of each digit as well as during the reverse and the forward readings of information recorded on the tape. The purpose of odd-even check is to make certain that each recorded digit contains an odd number of ones assigned by Univac's binary code. If this check finds that a digit has an even number of ones, the digit is considered faulty. For example, the code for the letter D is 1 01 0111. The code has seven channels. The first four, counting from the right, represent the actual code of the letter (channels 4, 5, 6, 7); the next two are zone channels (channels 2, 3); and the last one is the odd-even channel (channel 1). It is the last channel (channel 1) which determines whether the number of ones in the six channels 2 through 7 is odd or even. If there is an even number of ones in channels 2 through 7, the converter adds a one in the odd-even channel (channel 1). If there is an odd number of ones in channels through 7, channel 1 then carries a zero. Thus, the odd-even check ensures that a recorded digit contains an odd number of ones at all times. It does not concern itself with accuracy of code conversion; so long as an odd number of ones occurs per digit, the odd-even check finds no fault with the digit. The odd-even checker alerts the converter only when an even number of ones appears in a digit. The checking of code conversion is left to the comparator, whose function it is to ensure that the information sensed from the punched card is properly converted into Univac code.

The odd-even checking procedure is the same for all digits; therefore, a description of the procedure for one digit provides an understanding of the operation. The letter D will serve as an example throughout the description. Reexamining the code for the letter D=1 01 0111, it is evident that the alphabetic code channels 4, 5, 6, 7 combined with the zone channels 2, 3 contain four ones and two zeros. Thus, an even number of ones is present. Accordingly, channel 1 (odd-even channel) should have a one placed in it to make the total count of ones odd and thereby make the digit agree with Univac code. If, in this instance, the one should be missing in channel 1, the converter would stop because an error exists. The four quarter adders located at the top of the diagram represent the seven code channels as follows:

QA307D=channels 6 and 7
QA307E=channels 4 and 5
QA307F=channels 2 and 3
QA307G=channels 1 and sprocket If the input of a quarter adder is either two ones or two zeros, its output will be a zero. If the input is a one and a zero, the output will be one. Because the outputs of QA307D, QA307E, QA307F, and QA307G, FIG. 14, are cascaded to QA307A through QA307B and QA307C, the output of QA307A determines correctness or incorrectness of the digit. QA307A can have either a zero or a one output depending on its inputs from QA307B and QA307C. If its inputs are unlike, QA307A will have a one output; if its inputs are alike, QA307A will have a zero output. The output of QA307A, whether one or zero, is fed to G300. This gate becomes permissive only with the arrival of a zero output from QA307A and a *t*40 pulse from the sprocket generator. The permissive gate then passes the pulse to set FF302, FIG. 13. When the flip-flop is set, its output inhibits G305 which restricts the passage of any pulse to G457, FIG. 16 on record odd-even check and to set FF420 on read odd-even check. As long as G305, FIG. 13 has no output, the Odd-Even error bulb on the control panel does not light up, and the read head of the Uniservo sends the next digit to the odd-even checker. Thus, a zero output from QA307A indicates a correct digit; a one output, an incorrect digit. The odd-even check for the letter D follows. As stated previously, the Univac code given to the letter D is 1 01 0111. When the read head of the Uniservo transfers this digit to the odd-even checker, the channels of the digit are applied to the quarter adders as follows: QA307D receives a one representing channel 6, and a one representing channel 7; QA307E receives a zero representing channel 4, and a one representing channel 5; QA307F receives a zero representing channel 2, and a one representing channel 3; QA307G receives a one representing channel 1, and a one representing the assumed sprocket which originates in the circuitry of the odd-even checker itself (the sprocket is always represented as a one). When the various channels of the code for the letter D are applied to the designated quarter adders, the outputs are from QA307D a "0"; QA307E a "1"; QA307F a "1" and from QA307G a "0." These outputs are then fed in pairs as "0" and "1" to QA307B and "1" and "0" to QA307C, which in turn give the outputs "1" and "1" to QA307A whose output, as the final quarter adder is zero. Gate G300 awaits the arrival of a signal from this last quarter adder to keep it either permissive or inhibitive. It remains permissive if the output of QA307A is a zero and inhibitive if the output of that quarter adder is a one. It is at this point that the converter begins to detect whether an error is present in the digit and indicates absence of error as follows: G300 receives the output from QA307A (FIG. 14). The presence of this signal makes the gate permissive when a *t*70 or a *t*40 pulse arrives from the sprocket generator. The *t*70 pulse arrives from the sprocket generator to G300 every 70 microseconds during record odd-even check, and the *t*40 pulse arrives every 40 microseconds during read odd-even check. When the signal from QA307A and either a *t*70 or *t*40 pulse are present, G300 has an output pulse to FF302. The output pulse sets FF302 which places an inhibition on G305. As long as G305 remains inhibitive, FF420 remains restored and in this state does not light the Odd-Even bulb 160, FIG. 16. The converter, therefore, assumes that there is no error in the digit and begins the odd-even check of another digit.

Assuming that an odd-even error occurs, the coded digit representing D will be read out of QA307D; QA307E and QA307G as zero and out of QA307F as "1." A zero input into QA307B will result in a zero input into QA307A and the "1" zero input into QA307C will result in an input into QA307A of "1" with the result that the output of QA307A will be "1." The first step in checking for the source of error is to examine the inputs of the quarter adders which receive the coded digit. A check of these indicates that the code fed is 1 01 1111 instead of 1 01 0111. The error lies in channel 4. QA307E, therefore, has an incorrect input which causes the final output, that of QA307A, to be a one; evidence that an error is present. Because G300 can permit only a zero signal from QA307A, the one signal inhibits that gate and also prevents the passage of the *t*70 or *t*40 pulse through the gate to FF302. The flip-flop has no output and does not inhibit G305. A delayed *t*40 pulse from G400, FIG. 16, then passes through G305 to set FF420 and alert G457. In turn, 160FF420 lights the Odd-Even lamp to indicate that an error has been found in read, and the output of G457 fires a thyratron 167, FIG. 16, to show an error on record. The processed card and the one following it are ejected into the error bin, card feed is stopped, and the tape is stopped after the converter repositions it at the point where recording of the blockette began. The odd-even check, therefore, is conducted three times: once when information is being recorded on tape, again when the tape is read as it moves in the reverse direction, and finally during forward reading of the tape. If an error occurs during any one of these checks, the tape is stopped and brought back to the beginning of the recorded blockette. The recorded information is then erased when new informaton is recorded in the same blockette that contained the error. The odd-even checker does not function outside its own area of activity. All other errors are detected by special circuits whose combined function is to keep the converter performing efficiently, as will be later explained.

During memory refill, two pulses *p*34 and *p*74, obtained at the output of gates G103G and G103C FIG. 11, respectively, determine when the tape is to start moving. At *p*34 from G103G the tape moves in the reverse direction for odd-even and greater or less than one hundred and twenty check. At *p*74 from G103C the tape is started in the forward direction to compare the output of the refilled memory with the information recorded on the tape. The latter is set in motion in forward direction not only to compare but to check for greater or less than one hundred twenty characters, odd-even, card counter and mispunch errors as well. Memory read-out, after memory refill, is carried on in the same way as previously described. The read-out pulses are applied to assocaited circuits, but the cycling unit 70, FIG. 15, is stepped in a different manner. The memory read-out pulse and the column counter stepping and readout pulses are applied to associated circuits as before. This time, however, the output of the memory unit 50 is not encoded. Instead of going to the encoder 75 it is directed through lines 139 to the comparator indicated generally at 45 (FIG. 14) while information recorded on the tape is read into a decoder 99 (FIG. 14). In the latter, the information is converted to its original code form. At this point, the output of the decoder is, through lines 150, compared with the output of the memory 50 and in addition, with the mispunch detector 140 (FIG. 13); the card counter circuit 141 (FIG. 17); the greater or less than one hundred and twenty check in circuit 142 (FIG. 15); and the odd-even check circuit 143 (FIG. 14) as above explained.

When the tape moves in reverse direction, and is being read, the memory input circuits are refilling the memory unit 50 with the data read out of the card at the second sensing station 52. A pulse obtained at the output of G103G starts acceleration of the tape in reverse direction, this pulse being transferred from gate G103G to gate G405 over line 138 through pole 13 of the read-check relay (FIG. 15). The gate G405 is open and passes the pulse. The read-record relays are on "read" and the erase current is not applied to the tape. The output of G405 over line 109 sets flip-flop FF447 and the pulse leaving the set output side of the latter over line 137 alerts the gate G454 (FIG. 18) which passes the pulse and energizes the clutch 35 for reverse drive of the tape which starts at *p*34 and attains normal uniform speed one millisecond later, at which point the odd-even and greater or less than one hundred twenty checks begin.

At this point the cycling unit 70 must be stepped to check the number of digits recorded on the tape. Since the row counter 60 is not on rows 13 or 14 and cannot supply the stepping pulse, the sprocket pulse from the tape itself is used. Therefore, each time a digit is read from the tape, the sprocket pulse obtained steps the cycling unit at *t*0. The sprocket pulse *t*0 alerts gate G400 through line 144, the gate being open since error or stop signals are not present. The output pulse of G400 is differentiated and applied over lines 146, 147 to the gates and delay flops G413, 417, RDF414, DF500 and DF501, FIG. 15. The triggering of DF501 sends the pulse through the recirculation path of the cycling unit 70. All output pulses of the latter are used for memory read-out or row counting except those that alert Gate G202 through line 148, G201A–G201G through line 126, and those that reset FF202 through FF214 via line 125. Normally, the cycling unit controls the gates G202 and G201A–G201G and the flip-flops FF202–FF214. It is not necessary to alert the gates, in this instance, since the encoder 75 is not being used. However, the flip-flops must be restored. These were reset, previously, by a *t40* pulse from the output of DF500 which still resets FF202 to 213, FIG. 12, after each column read out. During forward check the output of DF414A, FIG. 16, is used to reset FF330A to FF300G, FIG. 14.

Figure 16:
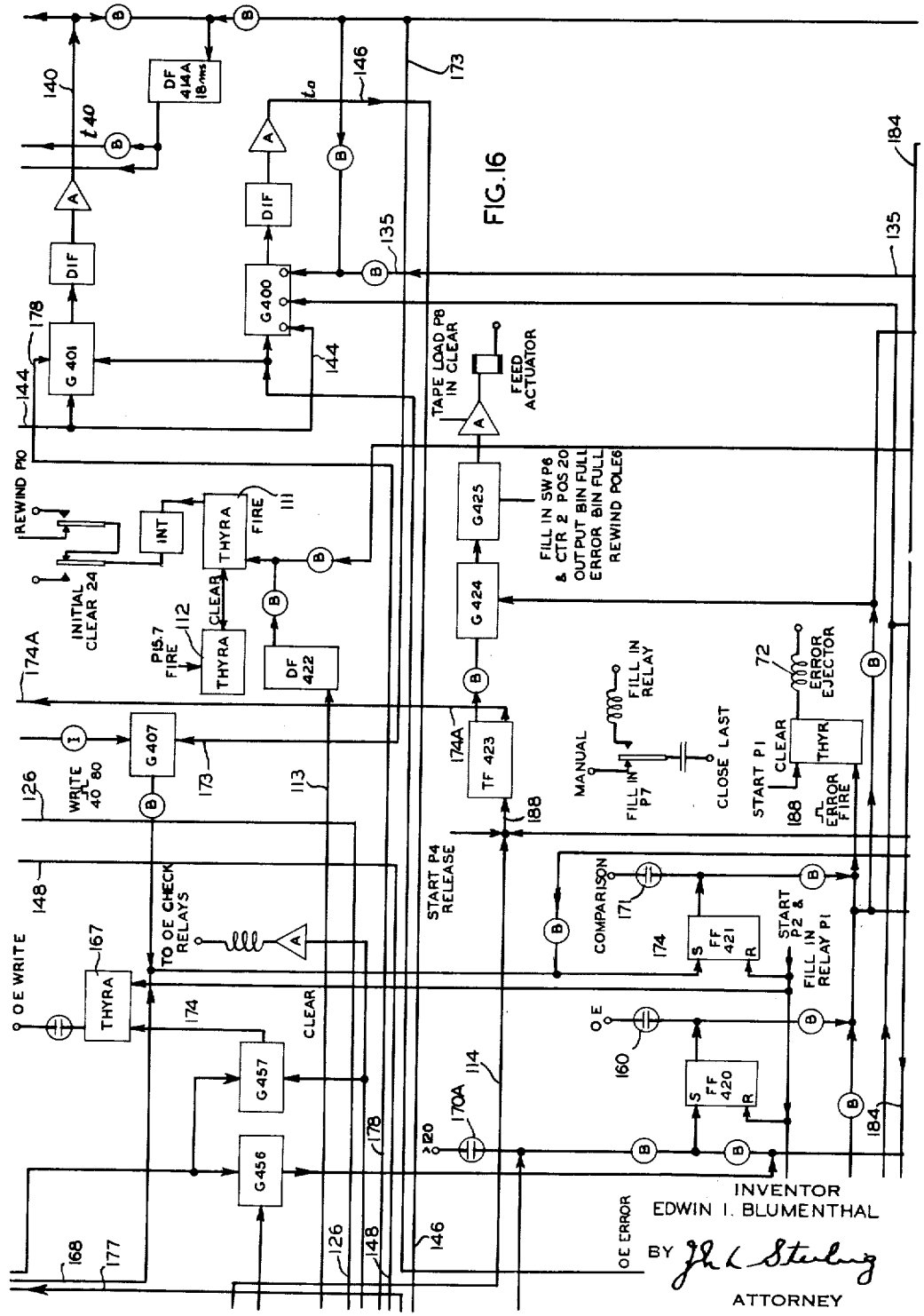
Figure 17:
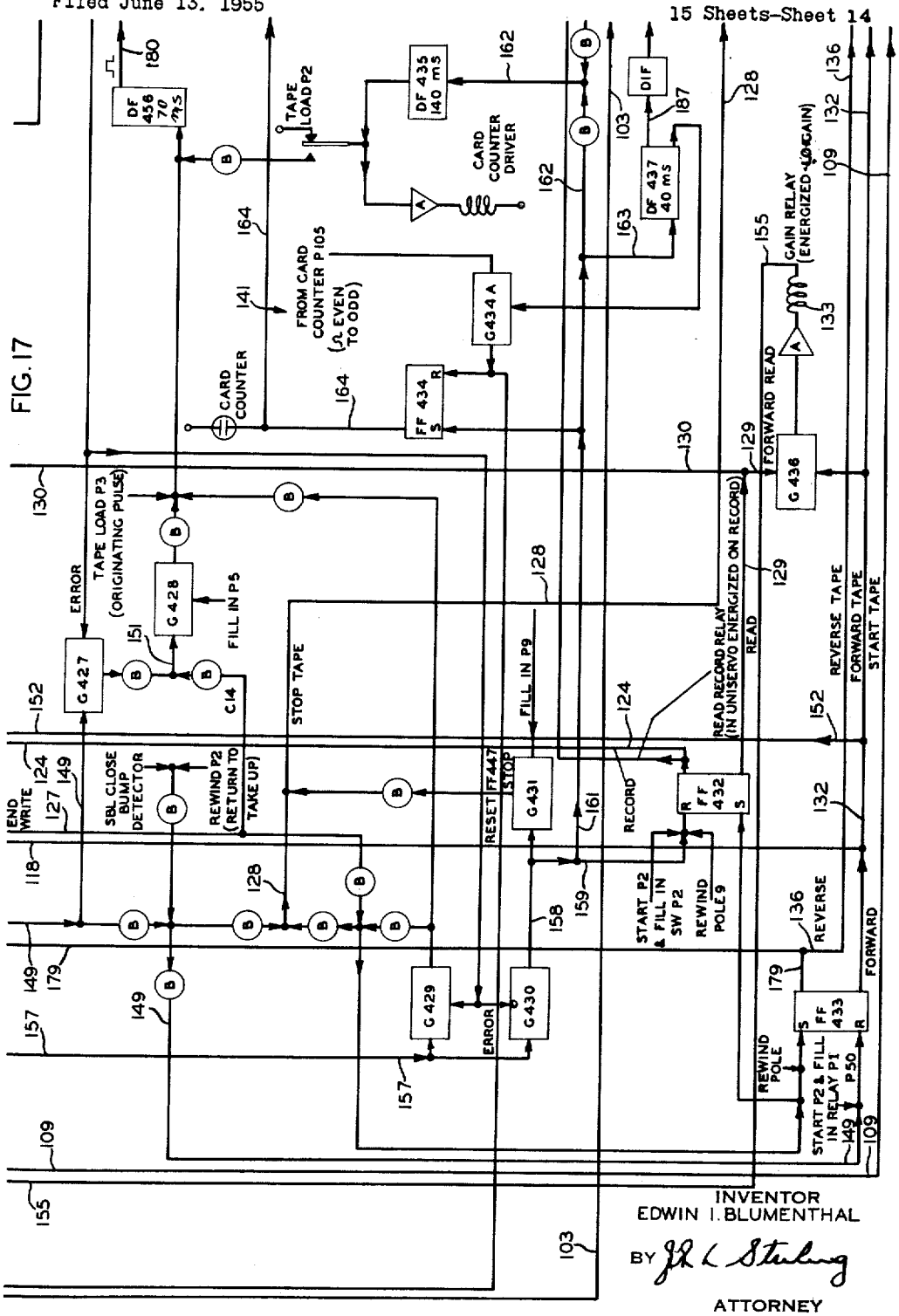

As the sprocket pulses are read from the tape, they are fed to G400, the output of which alerts gates G413 and G417 and triggers RDF414 through lines 144, 146 and 147, FIGS. 15 and 16. These elements are a part of the greater or less than one hundred twenty detector circuit 142 (FIG. 15) which is further discussed with the error circuit description hereinafter. If no errors are present, the odd-even and one twenty checks end at *p50* and the tape is stopped by a signal from the output of gate G510. This gate opens as the last sprocket pulse is recirculated. The sprocket pulse, delayed by DF501, fires RDF504 which remains fired for approximately 2 ms. and produces an output which is applied to gate G510. The pulse from RDF504 combined with one from the set side of FF433, through line 118, keeps G510 open. From the latter the pulse is transferred to G427 and FF433 over line 149, and to FF447 via lines 149 and 128. Gate G427, FIG. 17 applies the pulse by way of line 151 to the gate G428. Since the latter is not on "fill-in" it inhibits the pulse. The flip-flops FF447 and FF433, however, are affected by the pulse which restores FF447, leaves the restored output side of this flip-flop and energizes the brake coil of the clutch 35 through line 134 to decelerate the movement of the tape and bring it to a stop at *p50*.

*Second Forward Read Operation*

The tape control circuits are now switched from reverse to forward direction for comparison, odd-even, greater or less than one hundred twenty, card count and mispunch checking operation. The output of G510 at *p50* is applied to and restores FF433 over line 149, FIG. 17. The pulse from the restored output side of FF433 is sent to gate G304 via lines 132, 152, FIGS. 12, 13, 15 and 17; to gate G436 via line 132, and to gate G455 via line 132, FIGS. 17 and 18. The gate G436 passes the pulse to energize the gain relay 133. Gates G304 and G455 do not pass the pulse and each of these gates awaits a different pulse to open it, G304 at *t40* pulse and G455 a start tape pulse at *p74*.

As the twelfth row of the card is sensed at the second sensing station, the memory input gate G103C applies a tape start pulse at *p74* over line 138 through contacts 110 and P–13 through G405, over line 109 to the set side of FF447 and through the line 137 through G455, to the forward coil of clutch 35 so that the tape drive begins to accelerate feed of the tape in forward direction, the tape attaining uniform speed one millisecond later, FIGS. 11, 12, 15, 17 and 18. At *p76.7* the row counter delivers a pulse to FF409 over line 153, through contact P14 which pulse leaves the restored output side of said flip-flop and energizes the read-check relays to "read" via line 154, FIGS. 11 and 15. Reading from the tape begins at *p78*. The sprocket of each digit steps the cycling unit 70 as it did during the reverse tape check. The column counter 55 controls the memory refill read-out and supplies the fill pulses in the same manner as explained in connection with the first memory read-out.

Information read from the memory bypasses the encoding function table 75 and goes to the comparator 45, FIG. 14. At the same time, information read from the tape is decoded in the decoder 99 and transferred to the comparator. Here the information from the memory 50 and that from the tape are compared to determine whether the information on the card has been correctly processed in the converter. Each time a digit from the memory is compared with one from the tape, an odd-even check is made. Assuming that there are no errors, the comparator and other checking circuits do not stop the machine. When one hundred and twenty digits have been compared and checked, the card leaving the second sensing station 88 is grasped by the clips 59 of the stacking drum 57, FIG. 3 and, in the absence of an error, the eject magnet 72 is not energized and the card is deposited in the output bin 61.

At *p88* all checking operations are completed and two milliseconds later (at *p90*) the tape is decelerated. The "stop tape" pulse is obtained at the output of gate G511. The thyraflop RDF504 is fired for two milliseconds, and via line 156 during this time keeps G511 open. The other permissive signal for G511, FIG. 15, is already present because the gain relay was energized when gate G436 was made permissive (line 155). At *p90* the "stop tape" pulse from G511 is applied over line 157 to gates G429 and G430 (FIG. 17). The gate G429 inhibits the pulse since no error is present. The gate G430, however, passes the pulse and applies it over line 158 to gate G431; over line 159 to FF432; over line 161 to FF434; over line 162 to DF435 and over line 163 to DF437, FIG. 17. The gate G431 is not permissive due to the absence of a "fill-in" pulse, and, consequently does not pass the "stop-tape" pulse. The flip-flop FF432 is restored by the pulse to record condition and the read-record relays, in turn, are energized to the record position.

The "stop-tape" pulse sets FF434. From this flip-flop set output side, the pulse is applied to gate G438 via line 164, FIGS. 17 and 18. If the latter gate should receive a pulse via line 165 from DF437, the gate G438 would transfer a card counter error signal. The delay of DF437 is so arranged that FF434 is restored by an odd-even pulse from the card counter relays. If the card counter were not functioning properly, the gate G438 would be permissive and a card counter error would be indicated on the control panel. The "stop-tape" pulse triggers DF435 also. The card counter driver is then energized and a correctly processed card is counted and deposited in the output bin. At *p90*, then, the tape is stopped, the tape drive is set in forward position, the read-record relays are on "record" and the converter is ready to process the information on the next card. When all the information has been entered on the tape the latter is rewound and is ready for use in the electronic computer.

*Comparison Checking*

The comparison check is carried out only once during the processing of a card, when the tape is set in the forward direction during the second read-check of recorded information. The purpose of the comparison check is to determine the accuracy of translation of information by the converter from the punched card code Univac code.

To ensure that a correct translation has been made from the punched-card code to Univac code, the converter reconverts the information recorded on tape in Univac code to the original code of the punched card. (This information was sensed originally by the first sensing station of the card feed, sent to the memory, encoded, and then recorded on the tape.) After reconversion, the information is compared with that sent to the memory by the second sensing station. If the comparison check finds the two sets of information identical, the converter continues to process the next card. However, if the comparison check shows a discrepancy between the two sets of information, the converter is stopped, the tape is repositioned and the card from which the information was sensed is reprocessed—if desired.

Before the tape is set in forward motion to be read, the second sensing station of the card feed is sending information from the card to the memory in the same manner as the first sensing station.

The description of the comparison check begins logically at the second sensing station. While the greater than 120, less than 120 and odd-even checks are being conducted, the second sensing station 52 conveys the information from each row and column of the card to the corresponding row and column of the memory. It will be assumed that the memory has been refilled by the second sensing station and is prepared to read out its information. As the information sensed by the first sensing station and recorded on tape after being encoded is to be compared with the same information sensed by the second sensing station, memory read-out does not begin until the tape is set in forward motion to read and accelerated to a uniform speed.

Forward acceleration of tape starts when all the rows of the card have been sensed by the second sensing station. The start pulse is obtained from the out-put of G103C (p74, FIG. 11) and forward movement of the tape follows the pattern described in detail previously. The moment that the first recorded digit comes under the read head of the tape unit, the memory reads out the first column of information stored in it. Each column read out of the memory is immediately transferred to the comparator 45 where it is compared with the corresponding column of information recorded on the tape. The arrangement of the plugboard during second memory-read-out is the same as that during first memory-read-out. Therefore, the order of memory read-out in this instance is the same as the order in which the columns were recorded on the tape.

Because information is to be read from the tape, column by column, the circuitry employed permits only one column through at one time for decoding and comparison. The first circuit used is one consisting of seven channels. The second circuit is the sprocket generator, whose output is never coded, and therefore does not need to be decoded. Normally, when no information is fed to the seven flip-flops, FF300A–FF300G (FIG. 14) they remain restored and in this state advise the decoder that no digits are present. The restored state of the flip-flops changes immediately when a digit is detected by the read-record head of the tape unit. The pulses of the digit detected set the flip-flops. Once set, the flip-flops transfer the pulses to the decoder as well as to the odd-even checker 143 (FIG. 14).

The letter D will be used to illustrate the decoding operation. The code for this letter—1 01 0111—is transmitted to the flip-flops as shown in FIG. 14.

The five pulses that each represent numeral one arriving from the read-record relays 40 set the flip-flops, which send the signals to the decoder 99 and odd-even checker 143. The decoder, having accepted the signals, converts them to the punched-card code. In the case of the letter D, the code on the card has two punches in column one. (This column is used assuming that the letter D is the first letter recorded in the blockette under examination.) According to the code assigned to the letter D, one punched hole should be present in row 1 of the column and the second punched hole should appear in row 7 of the same column. The presence of the two punched holes in column one of the card should correspond to the information held in the corresponding column of the memory. When the memory dispatches its information to the comparator, the decoder should send the same information to the comparator. If the two sets of information do not agree, the comparator indicates that an error is present and the converter stops all operations.

FIG. 14 shows the output of the decoder 99 for the letter D. The one and seven, represent outputs of the decoder and correspond to the two punched holes in column one of the card. The decoder relays this information to the comparator, which has already received the information from the memory.

The comparator consists of twenty-four gates G306A to G306X, twelve for the twelve rows of information in the decoder, twelve for twelve rows of information in the memory. The function of these gates is simply to compare information from the memory with that from the decoder. The gates work in pairs, each pair consisting of one decoder gate and one memory gate. FIG. 14 shows this paired arrangement of gates for four index positions.

The letter D is used to illustrate a comparison check. Gates G306A and G306B represent row Y (or row 1); gates G306M and G306N, row 7. Each gate receives a pulse from the decoder and G306B receives a pulse from the memory. The paired gates are arranged so that a pulse applied to one gate makes it permissive, but inhibits the other. If pulses are applied to both gates of the pair, both are inhibited. For example, in FIG. 14 if G306A receives a pulse from the decoder and G306B receives a pulse from the memory, the pulse from the decoder applied at G306A is sent also to inhibit G306B. Likewise, the pulse from the memory applied at G306B is sent also to inhibit G306A. The gates inhibit each other, therefore, have no output. However, if G306A receives a pulse from the decoder and G306B does not receive a pulse from the memory, the pulse to G306A inhibits G306B while the absence of the memory pulse to G306B results in no inhibitory pulse to G306A. Thus, G306A permits the pulse from the decoder and has an output. G306B, inhibited by the pulse from the decoder, has no output. Two gates in the comparison-error circuitry, G301 and G302, are made permissive or inhibitive depending on whether there is an output from the gates of the comparator. G301 and G302 are so designed that if a pulse arrives from the comparator either one or both become inhibited. In this state they cannot pass a t40 pulse from the sprocket generator. As long as the t40 pulse is not permitted to set FF301, the flip-flop remains restored and its output cannot inhibit G303 line 166, FIG. 13. Consequently, a delayed t40 pulse passes through the gate and sets FF421 line 168. The output pulse of the set flip-flop lights the comparison error neon, and on the control panel alerts certain control circuits to the fact that a comparison error has been detected; whereas, the tape is decelerated and stopped only after the checking operation of the blockette is completed. At the end of this operation the tape is repositioned to start recording the next blockette of information. In this instance, FF301 being set, the output of the flip-flop inhibits G303 and delayed t40 pulse cannot pass through the gate in order to light the comparison error neon and alert various control circuits.

To illustrate the action of the converter when a comparison error occurs, let us again use the letter D. As stated previously, if D is the first letter in a blockette, its code would result in a pulse from row Y of the decoder to G306A and a pulse from row Y of the memory to G306B. Also, there would be a pulse from row 7 of the decoder to G306M and a pulse from row 7 of the memory to G306N. If all these pulses are present neither of the two pairs of gates would have an output. Therefore, there would be no inhibitory pulse on either G301 or G302. These gates would pass a t40 pulse to FF301 causing it to set. FF301's output would inhibit G303 and no t40 pulse would pass to FF421 to indicate an error. If, for example, row 7 of the decoder does not send a pulse to G302 of the comparator, G303 would not have an input. G306M, therefore, becomes permissive. G306M has an output in this case that is applied to and inhibits G301. The *t*40 pulse, consequently, cannot pass through G301 to G302. The absence of the *t*40 pulse leaves FF301 restored. This flip-flop, then, does not have an output from its set side and does not inhibit G303. A delayed *t*40 pulse passes through G303 and sets FF421. The output signal from the set side of FF421 alerts various control circuits to stop conversion process and reposition the tape as previously described.

One Twenty Check

In order to ensure that no less or no more than 120 digits appear in each blockette of information recorded on tape a check is conducted twice during normal operation: once when the tape is on reverse read, and again when the tape is on forward read.

The first read check for less or greater than 120 error begins after a blockette of digits has been recorded and the tape has been accelerated in reverse for reading off the digits. Concurrent with this check, the converter conducts an odd-even check which has been described heretofore. After the tape has begun to move at a uniform rate of speed in reverse, the first digit of the recorded blockette comes under the read head of the Uniservo. This digit, as well as all other digits in the blockette, consists of eight channels: seven representing Univac's binary code and one representing the sprocket pulse. The sprocket pulse marks the place on the tape where a digit is recorded. Because each blockette has 120 digits and each digit has a sprocket pulse, there should be 120 sprocket pulses in a blockette; therefore, the converter can determine from reading the number of sprocket pulses present whether a blockette contains a correct or an incorrect number of digits. As each digit of a blockette arrives at the read head of the tape unit Uniservo, the read head picks up the sprocket pulse which is amplified and simultaneously fed to G400 and G401, FIGS. 13, 14 and 16 of the sprocket generator 176. During the reading of the sprocket pulses and their transfer to the sprocket generator, the above gates produce two pulses, *t*0 and *t*40. When the converter is conducting read check, these pulses are used to step the cycling unit and to activate 120, odd-even and comparator-control circuits. The last named circuit, that of comparator control, does not perform its function during tape-reverse check since reading of information into the memory, although the card has reached the second sensing station, has not been completed. Consequently, the memory is not ready to read out information at this time until it has stored all data found on the card. On tape-forward check the memory has been filled with information sensed from the card at the second sensing station and comparison check takes place. Odd-even greater or less than 120 checks are carried out during both tape-reverse read and tape-forward read.

During card sensing, the cycling unit FIG. 15, is stepped by the row counter, and one of the cycling unit's outputs, controls the stepping of the column counter while its other outputs, control memory and encoder read-outs. The cycling unit is again used to step the column counter during the tape-reverse and the tape-forward read checks; the column counter being stepped during read check so that it can aid the counting of digits in the blockette. However, the row counter cannot introduce a start-recirculation pulse to begin the recirculation cycle of the cycling unit at this time, for during read-check the read-record flip-flop (FF432) is on read and in state sends an inhibiting signal to G507. The cycling unit, therefore, requires a stepping pulse from another source. This source is the sprocket generator. In turn, the sprockets generator must also be stepped before it can step the cycling unit, and this stepping must coincide with the arrival of a digit under the read-record head of the tape unit. To provide this simultaneity, the sprocket generator obtains its stepping pulse from the sprocket channel of each digit. FIG. 16 shows the application of the pulse from the sprocket channel-arbitrarily designated as a *t*0 pulse-to G400 and G401 of the sprocket generator. G400 is designed to develop a pulse which is, again arbitrarily, a *t*0 pulse; G 401 develops a *t*40 pulse. The *t*0 pulse indicates the beginning of the checking operation and the *t*40 represents the end of the operation. No other pulses are necessary during the tape-reverse check since there is no memory read-out, no recording operation and no inputs to the decoder.

The primary purpose of the sprocket generator pulses is to step the cycling unit and to activate the less or greater than 120 control circuits. Once these circuits have been activated, they undertake the various functions necessary during the checking operation.

The recirculation of pulses by the cycling unit, after it has been stepped, takes place in the same manner as during normal operation. However, the only pulse that is used at this time is the *t*40 pulse that steps the column counter each time a digit has been completely checked.

Two paths, one that determines less than 120 error and another that determines greater than 120 error, are followed by the pulse sent from the sprocket generator. FIGS. 15 and 16 show the logical function of the less than 120 and the greater than 120 error checking circuits. Both paths receive the *t*0 pulse from the sprocket generator.

The less than 120 greater than 120 checking operations will be explained separately in order to provide a better understanding of the logic. The less than 120 circuit will be described first.

Less Than One Twenty Check

At the beginning of the checking operation, that is, when the first digit comes under the read-record head of the tape unit, the less than 120 error path is closed by an inhibitive signal applied to G416 over line 168A, FIGS. 12 and 15. This signal on G416 continues as long as the column counter is on count one. Once the column counter has been stepped to count two, G416 is open unless the thyraflop TH419, FIG. 15 has an output indicating that a greater than 120 error is present. Therefore, at this time the only inhibitive signal on G416 is the output of the column counter on count one, a signal removed when the column counter is stepped.

The first *t*0 pulse from the sprocket generator via lines 146, 147 triggers RDF414, FIG. 15, a 240-microsecond retriggerable delay-flop. The delay time is restored to 240 microseconds. This provides ample time for the converter to probe the area of the tape in which the digit should appear. If no digit arrives to retrigger the delay-flop within the 240-microseconds delay, a less than 120 error is present and is so indicated by the converter. RDF414 has an output when a less than 120 error exists and this output is differentiated and fed to G416. The gate G416 is permissive since the column counter is not on count one and passes the pulse to set FF418. The set output of FF418 lights the less than 120 error neon 169A. However, the converter does not stop immediately, but waits until the entire blockette is checked. Consequently, the cycling unit recirculates until it receives the 120th count from the column counter which inhibits G507 and G508 via lines 117, 131, FIG. 15. Once these two gates are inhibited, the recirculation path of the cycling unit is closed and the sprocket generator is inhibited. Again, the output of G511 via line 157 is instrumental in stopping converter operation which is conducted in the same manner as that during normal card sensing operation. Once conversion operation is begun FF418 is set and its output via lines 169, 170 opens G508 and G507 is made permissive when the inhibitive signal is removed during recording process.

No matter at what period of the checking operation the error occurs, the converter first checks the entire blockette and the cycling unit recirculates until the column counter has been stepped 120 times, at which time checking operation has been completed. During the process of repositioning the tape, before forward-read check is begun, the comparison error line is jammed and lights up the comparison neon 171 on the control panel of the electronic unit. This would indicate that a comparison error has occurred and to avoid confusion with comparison error detection the greater than 120 error line is activated. It is also possible that, as the tape is repositioned, a less than 120 error may occur and the operator must be notified by some combination of neon lights on the control panel which would not be confused with error combinations already devised. Therefore, before the tape is repositioned the column counter is stepped to count four so that when a less than 120 error is detected the greater than 120 error lines are activated, which in turn energize the odd-even error lines. It can be said that the combination used to denote less than 120 error consists of comparison greater than 120 and odd-even neons being lit.

Greater Than One Twenty Check

The greater than 120 checks during reverse and forward reads are identical. FIGS. 15 and 16 show the circuit used in both operations. This circuit is set to remain closed until the column counter is stepped to count 120. With the stepping of the column counter to the 120th count, the circuit is open to admit a pulse indicating greater than 120 error.

The greater than 120 circuitry is activated in the same manner as the less than 120 circuitry. The same *t0* pulse which goes to RD414 over line 147 in the less than 120 circuitry goes as well to G413 and G417 of the greater than 120 circuitry. Each time a digit is detected, a *t0* pulse is sent to these gates by the sprocket generator, but the gates remain inhibited until the card counter is on count 120. It is assumed that at this time the 120th digit is read from the tape. Normally this digit is the final one in the blockette, but it is possible that an extra digit may have been recorded in the blockette. If an extra digit is present, its sprocket pulse keeps the greater than 120 circuitry open. The *t0* pulse from the 120th digit passes through G413, made permissive by the column counter on count 120, to DF415. This delay-flop holds the pulse for 120 microseconds, then applies it to G417. If a 121st digit is present in the blockette, its *t0* pulse from the sprocket generator should be present at G417 at this time. In such a case, the pulse from DF415 passes through the gate to fire TH419. It then lights the greater than 120 neon 170A, the odd-even neon 160 and stops the converter. The *t0* pulse from the 121st digit goes also to G413, but this gate does not pass the pulse since the column counter is no longer on count 120. The sensed card and the card following it fall into the error bin. Both cards may then be returned to the input bin in order.

Mispunch

Figure 19:
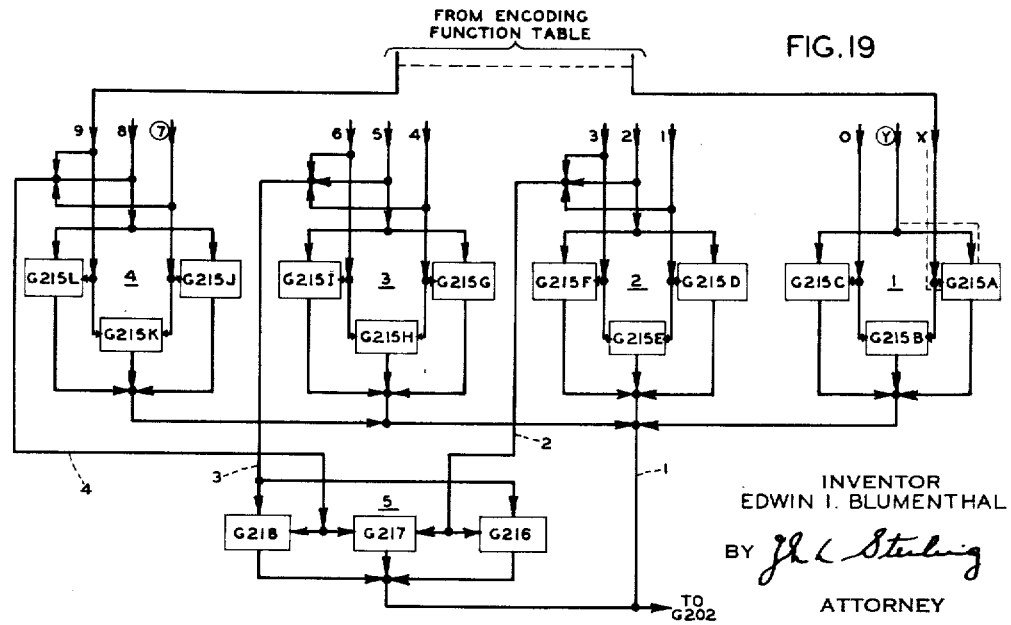
FIG. 19 is a diagram in block form showing the mispunch detector not detailed in FIG. 13.

More than two punches per column on a punched card are considered a mispunch. The purpose of the mispunch detection circuits 140, FIGS. 13 and 19, is to determine whether or not a mispunch is present on any of the columns of a card being processed by the converter. This operation takes place when the encoder is converting information from the punched card code into Univac code; but the converter does not signal a mispunch error, if present, until the memory is refilled by the second sensing station. The mispunch detector is not concerned with differentiating between the alphabetical card code and the numerical card code but is concerned only with determining whether a given column has more than two punches in it. FIGS. 13 and 19 show the arrangement of the mispunch detection circuit. The four sets, or triplets, of three gates each, shown at the top of the drawing of FIG. 19 G215A–G215L receive their inputs from corresponding rows assigned to them as shown. If any one of the triplets of gates has more than one input, one or all three of the gates become permissive and have an output. The triplets detect the presence of more than one input per triplet, but this situation does not ensure the detection of correct card code or incorrect card code. For example, if each triplet had an input this would immediately imply that an input to a triplet corresponds to a detected punched hole. It can easily be seen that such a combination of inputs to the mispunch detector is faulty and that it must be remedied at once before the output of these triplets reaches G202, FIG. 13. To ensure that the input to one of the three triplets corresponds to the code of the punched card, a fifth triplet is designed to receive the inputs of triplets 2, 3 and 4. The fifth triplet (G216, G217, and G218) makes certain that the total input of these triplets does not exceed one. Therefore, an input to triplet one and another to any one of the remaining triplets is considered a legitimate punched card code combination. Any other input combination is considered a mispunch. The output of this fifth triplet goes to G202. The function of G202 is to pass or inhibit a write pulse which is used to fire the mispunch thyratron 172. If a mispunch error is present, G202 is permissive and passes the write pulse through to fire the mispunch thyratron, thus alerting the converter to the fact that an error has occurred. Contrariwise, if a mispunch error is not present, G202 is inhibitive and the write pulse does not go through it to fire the thyratron. Thus, when G202 has an output, there is a mispunch; when G202 does not have an output, there is no mispunch.

The gate G202 may receive a pulse from any one of the five triplets of gates. If a pulse does appear at G202, the gate becomes permissive and passes a write pulse through to fire the thyratron 172 and indicate an error by lighting mispunch neon 172A. The purpose of the mispunch detector, then, is to inhibit G202 when there is no mispunch and to make G202 permissive when an error is detected.

The code of letter D will be used to illustrate the function of the mispunch detector. The letter D, as well as all other letters of the alphabet, requires two punched holes in a given column of the card. (For the time being, the order of the column is disregarded; mispunch detection does not concern itself with a column count.) The punched card code for the letter D calls for line 7 and line Y would each receive a pulse from the encoder.

FIG. 19 shows the application of the two inputs to their respective gates. The row Y pulse is applied simultaneously to two gates—G215A and G215C. These gates remain inhibited because each lacks a permissive signal. G215A requires a permissive signal from row X, and G215C requires a permissive signal from row 0. Because there is no permissive pulse at either of these gates, the Y pulse cannot be applied to G202, and an error is not present.

FIG. 19 indicates what occurs when G215A, for example, does have a permissive signal indicating the presence of an error. This diagram shows in dotted lines two pulses arriving at the triplet: one from row Y, the other from row X. Two pulses are now present at G215A. This gate becomes permissive and passes an error pulse. G215B and G215C remain inhibitive because a pulse is absent from row 0. The error pulse from G215A is applied to G202. When the write pulse arrives, G202, made permissive by the error pulse from G215A, passes the write pulse to the thyratron 172. The pulse fires the thyratron; the latter's output lights the mispunch neon to signify an error and alerts G407 as shown in FIG. 16. The alerted gate passes a *t40* pulse from G400 via line 173 through G407 and by way of line 174 to set FF421. This flip-flop is set so that its output from the set side can be used to activate circuits that stop card feed and the tape. The card with an erroneous punch and the card following it fall into the error bin. Then the operator can again start normal card feed.

The logical operation of the second, third and fourth triplets of gates is slightly different from that of the first triplet just described, but alike in respect to themselves. The explanation of one triplet of the three is sufficient for understanding the other two.

Like triplet 1, the input comes directly to triplets 2, 3 and 4; and the output goes directly to G202; but unlike triplet 1, the input goes also to the fifth triplet consisting of G216, G217 and G218. Because the code for letter D is being used to illustrate mispunch, triplet 4 with row input 7 will be used for the explanation that follows.

Any input to the triplet 4 of gates G215J, G215K goes as well to G218 and G217 of the fifth triplet. The outputs of both triplets 4 and 5 then go directly to G202.

The lines marked . . . 1, . . . 2, and . . . 3 represent the output of these triplets. If a triplet has more than one input, the end result is an error. The code of letter D calls for a pulse from the encoder through input line 7 to the triplet of gates G215J, G215K and G215L. This pulse is present and is applied simultaneously to G215J and G215K of the triplet. Each of these two gates needs an alerting pulse to make it permissive; G215J requires a pulse from input line 8 and G215K requires a pulse from input line 9. If these alerting pulses are absent, the gates have no output; and consequently, there is no mispunch error. In this instance, however, input line 9, which is not wanted for the code of letter D, carries a pulse to the triplets. Thus, the pulse from input line 9 is an erroneous one. The pulse is fed directly to G215L and G215K. Because no pulse is present from output line 8, G215L remains inhibited. G215K, on the other hand, has an input from line 7. Therefore, the presence of the correct pulse from line 7 and the incorrect pulse from line 9 causes G215K to have an output. This output is fed to G202 making it permissive and thereby causing it to pass a t40 write pulse from the cycling unit 70 through line 143 to indicate an error as above explained.

If triplets 2 and 4, for example, each had an input this would indicate the presence of more than the required number of punches in a given column. The two sets of triplets themselves have no way of showing error because one pulse per triplet is considered legitimate. Instead, G216, G217 and G218 which form the fifth triplet of gates serve as indicators of error presence. FIG. 19 shows the application of the outputs of triplet 2 and triplet 4 to this fifth triplet of gates. The presence of the two pulses makes G217 permissive, and its resulting output is fed to G202. The latter gate, made permissive by the presence of the write pulse, passes the error pulse from G217 through to fire the mispunch thyratron 172. The output of the fired thyratron lights the mispunch neon 172A and alerts G407. With the arrival of a t40 pulse, G407, FIG. 16 becomes permissive and sends its output to set FF421. The set output of FF421 lights the comparison error neon, and the converter is stopped.

The processed card and the one following it are ejected into the error bin. If required, the two cards are returned manually to their original positions in the input bin. After repunching the correct information the operator then starts operation of the converter once more.

Card Misfeed

It is possible that some mechanical malfunction of the converter may cause a misfeed of a card. A misfeed circuit is devised to detect such malfunction and inform the operator of its occurrence.

The logic of the circuit is such that if misfeed does occur, FF109 (FIG. 11) is set; if no misfeed is present, FF109 is restored.

During card conversion a signal obtained from the row counter 60 keeps FF109 restored while a card is processed. The circuit of this flip-flop associated with row count 2 has been arbitrarily chosen in this instance as the source of the signal. G113 receives the signal and, if no inhibitory pulse from FF409 is present, passes it to restore FF109. As long as a signal from the row counter is present at FF109, a pulse through line 174A from feed-thyraflop TF423 (FIG. 16) cannot set the flip-flop. Thus, the restored flip-flop indicates absence of misfeed. However, if no pulse is present at G113 from FF409, flip-flop FF109 is not restored by the output of TF423 which sets FF109 long enough to light up the misfeed neon FIG. 11. Once this occurs, the feed actuator magnet 29 is deenergized, the oscillation of the picker-knife arm is stopped, and the tape is brought to a halt. Card-feed operation is resumed only after the malfunction has been corrected and the start switch operated. "Misfeed" can also mean running out of cards, i.e. any attempt to feed with no leading edge detection following the attempt.

Fill-In

When all the information from a given group of cards has been converted and recorded on the tape, the converter records non-information digits to indicate to Univac that the remainder of a block has been filled and the recording of information has been completed. The purpose of fill-in operation, then, is to record 720 non-information digits on the tape after all the cards in a given group have been processed by the converter, if the last card fills a block.

During fill-in operation, non-information pulses are entered into the encoding function table 75 through FF202 to FF213, FIGS. 12 and 13, while the necessary control signals cause the converter to operate in a manner somewhat similar to that followed when a card is processed. Fill-in operation is the concluding operation of the converter before the tape is rewound and removed from the tape unit. When the operator moves a suitable tape leader fill-in switch to fill-in a number of operations take place which ready the electronic unit for the fill-in operation. The activation of the switch energizes the fill-in relay briefly until the relay drops out after discharging its supply condenser. During the time that the relay is energized, it starts the tape moving by sending a start signal directly to FF447, FIG. 18. The latter passes the signal to G455 and at the same time, sets in motion the card mechanism drive motor. Gate G455, made permissive by the start signal from FF447, sends a pulse to energize the coil of the tape forward-drive. The tape is accelerated forward and the recording of non-information pulses begins when the fill-in relay drops out and the tape gains uniform speed. From this point on, the operation of the converter, with slight variations, is the same as that during normal card processing.

During the fill-in operation write current is introduced into the channels where pulses are required. Between the pulses, and in all channels where no pulses are to be written, erase current flows through the coils of head 40.

The "erase" current removes any information that may have been recorded previously as explained in the Patents 2,625,607 and 2,686,100 above referred to.

The signal to start the "erase" current originates at the tape-leader fill-in switch. When the switch is lowered to fill-in, it sends a signal via line 176, FIG. 15, to G408. A "record" pulse keeps G408 open to alow the "erase" current pulse to pass through line 113 and trigger DF422 (FIG. 16). The output of this delay-flop fires the first thyratron 111 and keeps it fired during "record." At the end of "record" a pulse from G509 then fires the second thyratron 112 which in turn clears the first thyratron, thereby removing the "erase" current from the "read-record" head. When recording of another blockette begins, the first thyratron is again fired, and the "erase" current again flows through the "read-record" head. Because there are no cards being fed from the input bin of the card-feed during fill-in operation, the feed actuator magnet 29 remains deenergized. Therefore, many component circuits normally used during card sensing are not used during fill-in operation. Also, no cards are being sensed and the memory is not storing information. Pulses for the fill-in digits are applied directly to the encoding function table 75 by way of FF202 to FF213 and each recorded digit is checked for odd-even error. Any stray pulses or signals that may have been picked up during the initial phase of the fill-in operation are gated when a signal (X combination) is applied to the memory output circuit. The entering signal is placed when the fill-in switch is lowered, thus preventing any memory read-out. When FF212, FIG. 12 corresponding to the letter X, is actuated, it sends pulses into the encoding function table which codes the pulses into Univac's binary code and transfers them to its output circuits.

One millisecond after it has received a signal from FF409, the cycling unit is stepped by a pulse through DF411 via lines 114, 115 and 116. This one millisecond delay permits the tape to gain uniform speed (FIG. 15).

Once the cycling unit 70 is stepped, it recirculates the initial stepping pulse from FF409 120 times and also sends out various timed control pulses to associated electronic circuits in the converter. However, as stated previously, most of the pulses are ineffective because memory read-out is not necessary during this operation. Of the cycling unit's output pulses, the outputs of DF500 and of DF412 are the only ones used during recording of fill-in digits. These pulses keep the input and output circuits of the encoding function table open and alert certain control circuits as each digit passes through to the read-record head of the tape unit. In the meantime the output of DF501 via 123 and 177 steps the column counter and restores FF110 and FF111.

During the encoding function table read-out, the absence of the 120th count from the column counter 55 keeps the path of the cycling unit open until each blockette of the block is filled with non-information digits. When the 120th column counter signal is recirculated, G508 is inhibited by the signal via line 117 and remains so until the column counter is again on count one. This gate, which keeps the recirculation path open during memory read-out as well as during fill-in, is open because a tape-leader fill-in switch, when lowered to a fill-in position, restores FF418, thus placing a permissive signal on G508. During memory read-out and fill-in operation, G507 remains closed as long as FF432 is set.

At the end of the 120th count, a blockette of fill-in pulses should be recorded on the tape and to check the accuracy of the fill-in operation, the tape is stopped, then set in reverse. The stop-tape pulse is obtained in the same manner as that which stops the tape after information read out of the memory is recorded on tape. For the benefit of the read head 40 this operation is repeated so that the sequence of the fill-in operation is not abruptly broken. During cycling unit recirculation, thyraflop RDF504 FIG. 15 was triggered each time a pulse was recirculated. As each pulse was recirculated the thyraflop had no chance to be restored. When the 120th count is recirculated, it too triggers the thyraflop. Because there are no further pulses to trigger it, RDF504 recovers after two milliseconds of delay. The recovered thyraflop sends a stop-tape pulse to G509 which is kept open at this time by a pulse from RDF504 and a signal from FF432. Ultimately, the output of this gate is used to stop the tape via lines 127, 128. Presently, several circuits associated with stop-tape procedures, will be individually discussed.

Logically, the first circuit to be considered is the stop-tape circuit. G509 passes the stop-tape pulse from RDF504 to restore FF447, FIG. 18. The restored output of FF447 goes directly to the clutch 35 and energizes it to stop the tape, and goes also to G401, FIG. 16 of the sprocket generator and inhibits that gate. The purpose of inhibiting G400 is to prevent the sprocket generator circuit from inadvertently emitting a *0* pulse that may prematurely step the cycling unit. At this time, for the same reason as just explained, the output of RDF414, FIG. 15, inhibits G 400 of the sprocket generator through line 178.

The "read-record" circuitry is now switched from "record" to "read" in order to read the recorded information and check it for odd-even, less than 120 and greater than 120 errors. The stop-tape pulse from G509 that is used to energize the brake clutch coil and stop the tape is sent also to set FF432 and FF433 through lines 127—128, FIGS. 15 and 17. The set output of FF432 through lines 129, 130, 131 inhibits G507, which kept the recirculation path of the cycling unit open during record. G508, made permissive by the absence of a pulse from the restored side of FF418 keeps the cycling unit's recirculation path open during "read." Under these conditions the unit 40 can read the digits recorded on tape while the cycling unit distributes control pulses to various check circuits.

The set output of FF433 is applied to gate G454, FIG. 18, over line 136 and to G510 over line 179. The function of G454 is to permit a signal to accelerate the tape in the reverse direction when information on the tape is to be checked for less than 120, greater than 120 and odd-even errors. This gate becomes permissive only when it receives a start-tape-reverse signal from FF433.

While various control circuits are being adjusted automatically to set the tape in reverse direction, DF456, FIG. 17, transmits a signal to G441 in the same manner as that during tape-load operation. G441 passes the signal over line 181 to FF447 and sets it. The flip-flop then sends a start-tape signal to G454. The start-tape signal from FF447, FIG. 18, and the reverse-tape signal from FF433 via 136 open G454 and its output energizes the reverse coil of the clutch. The tape is accelerated in reverse, and when it attains uniform speed, checking operation begins. The checking operation at this time is identical to that followed during normal card sensing.

After the tape-reverse check has been completed, the tape is stopped and switched to forward. A recheck for less than 120, greater than 120 and odd-even errors is then made while the tape is moving forward.

The stop-tape pulse at the completion of tape-reverse check during fill-in, is obtained from G510, FIG. 15, rather than from G509. A signal from restored FF433, as stated before, is already present at G510 which, however, remains inhibitive until a pulse from RDF504 arrives at the end of tape-reverse check. Then, the cycling unit's recirculated pulse fires RDF504. The output of RDF504 is differentiated and the trailing edge of the pulse is fed to G510. This gate becomes permissive and sends a stop-tape pulse to the restored side of FF447 via lines 149 and 128. The restored output of FF447 goes to the brake coil of the clutch which stops the tape.

The same pulse from G510 that is used to stop the tape is used to switch the tape to forward. After leaving G510, the pulse restores FF433. The output from the restored side of FF433 is sent via line 132 to G455, FIG. 18, as a tape-forward pulse and to G304 via line 152 to be used in checking for comparison error. During fill-in no comparison check is made because no cards are being processed and, consequently, no information from the cards can be compared with non-information digits on the tape. Therefore, the fill-in relay, pole 8, FIG. 13, inhibits G304, and the gate does not pass the pulse from restored FF433.

The gate does not pass the tape-forward signal from restored FF433 until a start-tape signal is also present. This start-tape signal is sent from G510 to G427. No error signal is present to inhibit G427, FIGS. 15 and 17, and it passes the signal to G428. Fill-in switch, pole 5, makes G428 permissive and the gate transmits the signal to DF456 where it is delayed to give FF433 of the forward-tape circuit time to restore before sending the forward-tape signal to G455. The delay also permits FF447 FIG. 18 in the stop-tape circuit to restore and send its output to the brake coil of the clutch to stop the tape. Both of these operations must be performed before the pulse which is used to start the tape forward leaves DF456. When the pulse does leave DF456, it is differentiated and its trailing edge is applied to G441. Because tape-load operation is not being carried out now, pole 9 of the tape-load switch opens G441 and permits it

33 to pass the pulse via line 181 to set FF447. The set output of FF447 goes to energize the card feed roll drive as well as to G455. When the pulse arrives at G455, the gate produces an output which energizes the forward coil of the clutch. The tape begins to accelerate and one millisecond later attains uniform speed. At this moment recheck operation is begun. This operation uses the same circuitry as that used during normal card sensing.

When the converter has completed the recheck of the fill-in digits during tape-forward read, G511, FIG. 15 passes a trailing edge signal from RDF504, an end-read-forward pulse, that is applied to G429 and G430 over line 157, FIG. 17. These two gates are so arranged that when an error pulse is present, G429 is permissive and G430 is inhibitive. Conversely, when no error pulse is present, G430 is permissive and G429 is inhibitive. At this time we assume that no error pulse is present and G430 passes the pulse from G511 while G429 does not do so. After passing through G430, the pulse goes to G431, FF434, DF437 and DF435. During normal card sensing operation, G431 is permissive and passes the pulse directly to restore FF447 and stop the tape between each blockette of information. However, during fill-in operation G431 is inhibited by fill-in relay, pole 9, and cannot pass the pulse.

The tape does not stop at the end of forward reading of each blockette during fill-in, but stops only when the complete block of fill-in digits has been read. Therefore, the pulse follows a path that leads to continue fill-in circuitry and steps the card counter when 6 blockettes have been read and stops the tape when the entire block has been read. This path utilizes FF434, DF437 and DF435 (FIG. 17). The flip-flop FF434 is set by a pulse from G430. The pulse to DF437 triggers this delay-flop and the signal of 40 milliseconds is sent to G434A. The signal keeps G434A permissive so that it can pass the odd-even pulse from the card counter. When the odd-even pulse does not arrive, the flip-flop is not restored; whereas, if it arrives, after 40 milliseconds, the pulse cannot pass through G434A. Consequently, FF434 remains set and informs the converter that the card-counter mechanism is not functioning properly. This is done by gating the recovery signal of DF437 through G438 which then sets the odd-even flip-flop FF420 and actuates the error lines. The restored flip-flop FF434, then, is an indication that the card-counter mechanism is operating efficiently because G430 is inhibited.

At the end of 40 milliseconds the output of DF437 is differentiated and its trailing edge signal sent to G438 and G439. The pulse to G438 passes the gate only if a counter error signal is sent to the gate from set FF434. We assume that FF434 has been restored; therefore, no counter-error signal emanates from FF434 to alert G438. The differentiated pulse from DF437 does not pass G438 under this circumstance. The gate G439 permits the trailing-edge pulse from DF437, when an error signal does not pass through fill-in switch, pole 4, FIG. 18, to inhibit the gate. Again, we assume that no error is present; consequently, G439 passes the pulse from DF437. G442 receives the pulse and, with an alert signal from row counter one through line 103 (no-card-filling memory) present because no cards are being processed during fill-in, sends the pulse to G443 and G445. If blockettes not equal of fill-in digits have been read, G443 passes the pulse through to DF453 as a continue fill-in pulse. From DF453, after one millisecond, one output goes to trigger the "record" thyratron while another output is differentiated and its trailing edge used to step the cycling unit 70 through line 184, FIGS. 15, 16 and 18.

G445 is open only when the card counter equals six (signifying that an entire block of digits has been read) and it passes the end fill-in pulse to restore FF447. The restored output of FF447 energizes the brake coil of the clutch and the tape is brought to a stop.

34

Tape Loading

Once specific preliminary starting operations have been undertaken, tape-load operation follows whenever a new reel of tape is placed in the tape unit. The purpose of tape-load operation is to by-pass the nonmetallic portion of the tape leader and to bring the recording portion of the metallic tape under the "record" head 40.

After the new reel of tape has been placed it is then run for a period equal to the time required to record and check two blocks of information. At the end of this short run, the metallic part of the tape is under the "record" head. The tape is automatically stopped and the unit is ready to record information. The tape-load pulse is fed to DF456, FIG. 17, which delays the pulse for 70 milliseconds. This delay is not necessary to tape-load operation, but DF456 is in the direct path of the tape-load operation. Again, the delay is no real hindrance as cards are not being processed at this time.

The output of DF456 triggers a 760 milliseconds thyratron 183 by way of three switches FIG. 18: pole one of the tape-load switch, bank two of the block counter switch, and pole five of the rewind switch. FIG. 18 shows the path of the pulse and the circuit used to start the tape. The output of the thyratron 183 sets FF449 which in turn transfers the pulse to card-counter relay three. The latter does not pass the pulse since there are no cards processed at the present time.

The only path for the pulse to follow is pole five of the tape-load switch. The switch, activated at the beginning of the tape-load operation, feeds the pulse via line 185 to G448. In turn the gate G448 is alerted by pole one of the fill-in switch; therefore, the gate permits the pulse via line 181 which sets FF447. The output pulse of FF447 is fed directly to G455. At the same time a pulse from FF433 is sent via line 132 to G455. The two pulses combine to alert G455, the output of which energizes the drive coil of the tape unit. The tape begins to unwind. Each time a portion of tape equal to a blockette is unwound the output of DF435 energizes the card counter driver. During the first card count, pole two of the tape-load switch is activated. The switch closes the circuit leading to the input of DF456. Each time the card counter is stepped, DF456, FIG. 17, is triggered and in turn fires the thyratron 183, thereby sending a start-tape pulse to FF447. The output of the delay-flop is recirculated and the card counter activated.

When a count equal to that for twelve cards is completed, the output of DF456 follows the path of the end-of-bad-spot circuit which consists of the 760-millisecond thyratron 183, FF449 and gate G451 via line 186 (FIG. 18). This is the direct circuit to FF447. Once the pulse has traveled the circuit and has restored FF447, a signal is sent to the brake coil of the clutch to stop the tape.

The signal originates at the output of DF456 which had been firing the thyratron during the recirculation of the card pulses. As the twelfth card count occurs, DF456 initiates its last pulse which fires the thyratron. When no further pulse arrives, the thyratron restores FF449 which, in turn, alerts G451. The output of the flip-flop and a signal from pole one of the fill-in switch make this gate permissive. The output of G451 is buffed into and restores FF447. From the restored output side of FF447 a stop pulse is sent to the brake coil servo drive, which stops the tape.

The metallic portion of the tape is now under the record head of the tape unit and is held there until card feed begins. The operator lowers the tape-leader fill-in switch to neutral position, which action returns the poles of the tape-load switches to their original positions.

Tape Bad-Spot

The tape used in the card-to-magnetic-tape converter has imperfections which must be by-passed during recording of information. These areas have been marked during pretesting of the tape and are indicated by one hole punched in the tape at the beginning of the bad-spot area and holes punched at intervals of about two and one half inches until the end of the bad-spot area. This section explains the converter's method of detecting bad-spot areas during card sensing, tape-load and fill-in operations. A photocell placed several inches ahead of the write head in the tape unit, but not shown herein, is used to detect bad-spot areas. When the photocell detects the first punched hole of the bad spot, the hole is converted into an electric signal that is fed to the electronic unit. The first element met by the signal is the 760 millisecond thyratron 183, FIG. 18. The signal fires the thyratron and its output sets FF449. The set side of FF449 represents beginning-of-bad-spot-area. The photocell does not transmit the electric signal indicating bad spot to the electronic unit until the converter has completed the read, record and check operations required during the processing of a card. For example, if the converter is recording information on tape at the same time the photocell detects the first bad-spot hole; the recording operation is completed, the tape is reversed and the information on it read and checked. Then the tape is switched to forward and the information on it is read and checked once again before the bad-spot signal is sent to the electronic unit. The tape is then decelerated and stopped. In the meantime, the electronic unit gets set to by-pass the bad spot. The set side output of FF449 goes to certain control circuits as well as to pole three of the card counter relay. One contact of the pole ≠6, passes the pulse when five consecutive blockettes are recorded in a block and the other contact, marked =6, passes the signal when the sixth blockette is recorded within a block, that is, when a block contains the required number of blockettes. If the block has the required number of blockettes, the card-counter-relay pole does not permit the passage of the bad-spot signal until a predetermined space has been placed on the tape anywhere except between blocks, i.e. between the sixth and the first blocks. As soon as this space has been set, the arm of the relay is changed to the contact marked ≠6. The relay pole transfers the signal to and inhibits G424, FIG. 16, which stops card feed. The signal is sent also to pole four, FIG. 18, of the fill-in switch from where it is fed to G439. The purpose of this gate is to permit the end-of-bad-spot pulse on fill-in. At the present time the converter is not on fill-in; therefore, the pulse that opens G439 is the output of DF437, FIG. 17, which is triggered by the output of G511 by way of G430 and lines 163, 162, 161, 158 and 157. The 40 milliseconds delay of DF437 is long enough to keep a permissive signal on G439 so that it passes the bad-spot signal. From G439, the signal is sent to G442 which is made permissive by the presence of a signal from the row counter via line 103. Since there are no cards processed, the counter is sitting on count one. It is this signal which is used to alert G442. From here the signal is simultaneously fed to the three gates G443, G445 and G448. At this time only one of these, G448, is designed to pass the start-tape signal, FIG. 18.

The purpose of gate G443, during fill-in operation, is to pass a pulse to step the cycling unit via line 187, DF453, and lines 184 and 116, and to trigger the record thyratron in the tape unit. For the present, however, the gate G443 is inhibitive because the contact pole, pole one, of the fill-in switch does not transfer a permissive signal to card counter switch two. This gate, then, can be ignored for the present.

The purpose of gate G445 is to permit a "stop-tape" pulse when the fill-in operation has been completed. Because the converter is not on "fill-in," the gate remains inhibitive; furthermore, it does not receive the permissive signal on "fill-in" until the contact arm of pole one of the fill-in switch is changed during fill-in operation. The end-of-bad-spot signal, then, does not pass through G445.

The gate G448, made permissive by the fill-in switch, pole one (the switch remains in this position when the converter is not on fill-in), passes the start-tape pulse to set FF447. The output of the set flip-flop energizes the brake coil of the clutch 35, and makes permissive G455, which is receiving a forward pulse from FF433 over line 132, FIGS. 17 and 18. At the end of the recording of a blockette, FF433 is restored and places a pulse on G455 whose output energizes the forward drive coil of the clutch. The tape is accelerated, attains uniform speed and moves in the forward direction until the second hole of the bad spot, which indicates end-of-bad-spot, is detected. The bad-spot-detection photocell once more fires the thyratron 183 whose output restores FF449. The restored side of FF449 produces an output, lines 186, which energizes the stop-tape circuit line 128 and the card-feed circuit line 137 and deenergizes all circuits not used at this time. The output of FF449 is differentiated, and the trailing edge of the pulse is peaked and applied simultaneously to G451 and G452.

The purpose of G452 is to permit a pulse through lead 187 designating end-of-bad spot during fill-in. The gate G452 inhibits passage of the pulse. Pole three of the fill-in switch as shown provides a signal to make this gate inhibitive when the converter is not on fill-in so that the differentiated pulse cannot pass through the gate. The purpose of G451 is to permit a pulse which will stop the tape and start card feed when end-of-bad spot is passed. The presence of a pulse from FF449 and a signal from pole one of the fill-in switch, makes G451 permissive. The contact arm of pole one of the fill-in switch is so placed that during no-fill-in operation it feeds a pulse simultaneously to G451 and G452. Gate G452 is inhibited by a signal from fill-in switch, pole three. The gate G451, made permissive by the differentiated pulse from FF449 and pole one of the fill-in switch, passes the differentiated pulse to FF447 and TF423 via line 188. A stop-tape signal is obtained from the restored side of FF447, which signal energizes the brake coil of the tape unit and inhibits G400 through lead 135, FIG. 16, to prevent any stray signals from being introduced into the circuit, thus stepping the cycling unit via 146. Thyraflop TF423 sends its pulse to start card feed once the bad spot has been cleared. The next card from the bottom of the stack in the input bin is inserted into the machine and the converter resumes conversion process.

Except for slight variations, bad-spot detection during fill-in is the same as that during card sensing. The fill-in-bad-spot operation does not begin until the recorded blockette has undergone all the required checks. When the output of G510 through lines 149 and 128 (FIGS. 12, 17 and 18) restores FF447, the tape then is stopped in the normal manner and is started when the flip-flop is set by the output of G448 through lead 181. Three operations during bad-spot detection on fill-in use circuitry differing from that used during bad-spot detection in card sensing. These are end-of-bad-spot detection, continue fill-in when a block must be completed, and stopping the tape when fill-in has been completed. The three operations will be described in the order mentioned. Let us assume that the bad spot is detected when the fifth blockette of a block has been recorded on tape. This, of course, means that one more blockette must be recorded if the block is to contain the required number of blockettes. The differentiated output from the restored side of FF449 is fed to G451, G452 and G439A. The last two gates place permissive signals on G439. Normally, G439 becomes permissive when it receives a pulse from DF437 or G452 or G439A during card processing; however, G452 becomes permissive when end-of-bad spot is detected during fill-in. It is important to bear in mind that end-of-bad-spot detection does not require stoppage of the tape if the converter is to continue fill-in operation. It is this operation which insists that G439 be made permissive if fill-in operation is to be resumed. The following description explains this process.

The output of FF449 is differentiated before being applied to G452 and is sent to G451 as well. G451 is permissive only when the converter is sensing or converting information from cards. During fill-in it is inhibited by pole one of the fill-in switch which changes contact during fill-in and no longer supplies a permissive signal to the gate. As long as this condition remains, G451 does not permit the end-of-bad-spot pulse. G452, on the other hand, is inhibited during card sensing by pole three of the fill-in switch, but becomes permissive during fill-in operation when the inhibitory signal from pole three is removed. Thus, at the present time G452 passes the end-of-bad-spot pulse through to G439. Gate G439 is made permissive by the end-of-bad-spot pulse from the output of G452 and G439A.

The function of G439A, FIG. 18, is to permit an end-of-bad-spot pulse as long as an error pulse is not applied to the gate from any of the various error circuits of the converter. The presence of an error pulse, therefore, would inhibit G439A. At this time no error pulses are applied to the gate, and it permits the end-of-bad-spot pulse. The transfer of the pulse now depends on pole four of the fill-in switch. On end-of-bad-spot detection during fill-in, the switch closes the circuit and passes the pulse to G439. As previously stated, G439 has received an end-of-bad-spot pulse from G452. With the arrival of the pulse from G439A, G439 becomes permissive and its output is fed to three gates: G442, G445 and G448. The purpose of G445 is to start the tape, while that of G448 is to stop the tape. Because the tape is now moving forward, there is no need to start it, and G445 is inhibitive. Again, there is no need to stop the tape because the converter is ready to resume fill-in operation when the end-of-bad-spot is cleared, at which time the record thyratron is triggered and the cycling unit is stepped. Therefore, G448 is now inhibitive. G442, however, is made permissive by the presence of a pulse over lead 103, FIGS. 11, 15, 17 and 18, from the row counter on count one and the end-of-bad-spot pulse. G442 passes the end-of-bad-spot pulse to G443. This gate steps the cycling unit via lines 189 and 184 and triggers the record thyratron in order that fill-in operation may continue Pole one of the fill-in switch, it has been seen, closes the circuit to card counter 2 switch as long as the converter is on fill-in operation. The switch transfers a permissive signal to card counter two, and the latter switch then closes the path of the permissive pulse because a complete block has not yet been recorded on tape. The application of the signal from card counter two and the end-of-bad-spot pulse from G442 causes G443 to permit the end-of-bad-spot pulse from where it is sent to DF453. Here the pulse is delayed for one millisecond. At the end of this delay, the pulse is used to step the cycling unit and trigger the record thyratron. Fill-in operation is resumed and the blockette not needed to complete the block is recorded with fill-in digits. It can be concluded that end-of-bad-spot and continue fill-in operations are simultaneous. Card counter two switch now closes the circuit to make G445 permissive and G443 inhibitive. G443 is not needed at this point because no further bad-spot areas have been detected. However, the output of G445 is now used to stop the tape when a complete block has been recorded. Therefore, the stop pulse leaves G445 and restores FF447. The output of the restored flip-flop, in the form of a stop-tape pulse, is applied to the brake coil of the clutch to stop the tape. Should the operator want to record another block of fill-in digits, he activates the fill-in switch on the control panel of the electronic unit. Fill-in operation resumes. The tape is completely recorded when fill-in operation ends.

Although no information is recorded during tape-load operation the detection of bad-spot areas is just as important at this time as during any other operation of the converter. The importance of bad-spot detection during tape load lies in the fact that when the converter is ready to record information on the first block of the tape, it must not have a bad-spot area under the read-record head of the tape unit.

Bad spot detection during tape load involves the use of most of the circuits described previously under other bad-spot operations. There are, of course, slight variations which give rise to variance in circuitry as compared with other bad-spot operations. The bad-spot pulse, after firing the thyratron 183, sets FF449 and also activates pole five of the tape-load switch which in turn closes the start-tape circuit used at this time. The flip-flop remains set, but its output has no effect as long as G439 is inhibited by absence of a pulse from either G452 or DF437. The bad-spot pulse, then, is transferred to G448 by way of pole five of the tape-load switch and line 185, FIG. 18. When the converter is on tape load, pole five of the tape-load switch closes the circuit leading to G445 and G448. The former gate is designed to permit a pulse to stop the tape after a complete block of information has been recorded. At the present time, the block counter has not counted any block; it rests on count one. Consequently, the card-counter switch does not place a signal on G445. Thus, G445 is inhibited and does not pass the bad-spot pulse. G448 passes the bad-spot pulse as it did during fill-in, but the pulse follows a circuit set up only for use during tape-load operation. G448 is kept open to pass the bad-spot pulse by fill-in switch pole one in the position shown in FIG. 18. If this switch should change position, it closes G448. The presence of the signal from the switch at this time allows G448 to pass the bad-spot pulse to set FF447. The output of the set side of this flip-flop is then applied to G454, G455, the card feed roll drive and pole one of the rewind relay. The tape is not stopped but continues to move forward until the end of the bad-spot area has been detected. The end-of-bad-spot detection and the subsequent stopping of the tape during tape load is the same operation as that taking place during card sensing and fill-in operations.

Reference herein has been made to certain pulse cycles and durations and it is to be understood that these are used by way of example to more clearly bring out the operation of the converter and may be varied to conform to the speed with which cards are passed through the converter.

While I have described what I consider to be a highly desirable embodiment of my invention, it is obvious that changes in form could be made without departing from the spirit of the invention and I, therefore, do not limit myself to the exact form herein shown and described, nor to anything less than the whole of my invention as hereinbefore set forth, and as hereinafter claimed.

What is claimed is:

1. The combination with spaced means for sensing data in a first record and means for feeding the record to bring spaced data positions thereof in succession to each of the sensing means; of record detector means coacting with each sensing means and controlled by the positions of the leading edge of the record at each sensing means for initiating a pulse; means for circulating said pulse in a circuit including said sensing means; counting means having an output pulse corresponding to the successive data positions, means comprising gate circuits adapted to enable said pulse initiating means by a first pulse of said counting means and to block the pulse of said initiating means on a subsequent pulse of said counting means and means for storing the sensed data at the point of coincidence of the pulses from the counting and sensing means; means for recording on a second record the data read out of said storage means; and means for moving said second record past said recording means.

2. Apparatus as in claim 1 wherein means comprising circuits are adapted to delay the passage of a counting means stepping pulse to enable circulation of a pulse through said sensing means prior to operation of said counting means.

3. The combination with means for sensing data in a record and means for feeding the record to bring spaced data positions thereof in succession to said sensing means; of a magnetizable pulse transfer means movable in synchronism with said record feeding means; magnetic transducing means positioned in operative relation to said transfer means for recording on and reading from said transfer means a pulse representation at points respectively spaced to correspond to the spacing of said data positions; a pulse initiating record detector means controlled by the position of the record in said sensing means for supplying a single pulse to a circuit including the transducing and sensing means, gate means and a data position counting means; and said gate means being controlled by said counting means to pass the single pulse for circulation through the transducing, sensing and counting means; and said counting means upon receipt of said pulse being adapted to recondition said gates for recirculation of the pulse a number of times through the transducing, sensing and counting means under control of said transfer means.

4. The combination with spaced means for sensing data in a first record and movable means for feeding the record to bring spaced data positions of the latter in succession to each of the sensing means; of detectors associated with each sensing means and coacting with the leading edge of the record for initiating a pulse; a magnetizable pulse transfer member movable in synchronism with said record feeding means; spaced magnetic transducing means positioned in operative relation to the magnetizable member for recording on and reading from said member; pulse counting means; means comprising gate circuits adapted to enable said pulse initiating means by a first pulse of said counting means and to block the pulse of said initiating means on a subsequent pulse of said counting means.

5. The combination with spaced means for sensing data in a first record and movable means for feeding the record to bring spaced data positions of the latter in succession to each of the sensing means; of detectors associated with each sensing means and coacting with the leading edge of the record for initiating a pulse; a magnetizable pulse transfer means movable in synchronism with said record feeding means; magnetic transducing means positioned in operative relation to the transfer means for recording on and reading from said pulse transfer member at points respectively spaced to correspond to the spacing between said rows of data; circuit means including a memory unit, gate means, pulse counting means and said transducing means; said circuit defining a plurality of pulse paths and said row counting means on one count controlling the operation of said gate means through one pulse path to pass a pulse through the other pulse path for controlling the subsequent operation of said counter.

6. The combination with means for sensing data in a record and means for feeding the record to bring spaced data positions thereof in succession to said sensing means; of a pulse transfer means including a magnetizable member and a transducing means for recording a pulse representation on said member and for reading said representation from said member, said transfer and transducing means being relatively movable with respect to each other for coordinating the recording and reading of the representation with the space between said data positions; data position counter pulse means; a pulse initiating means controlled by the position of the record in said sensing means for supplying a single pulse to a circuit including pulse gating and delay components, the sensing means, the transfer means and the counter means; said gating components being conditioned by a first pulse from the counter means to pass said single pulse for circulation through the circuit and being conditioned by subsequent pulses from said counter means for recirculating the single pulse independently of said pulse supply.

7. A device of the character set forth in claim 6 including; means for recording data on a record in which item groups are each of predetermined extent means for transmitting data, in item groups of varying extent, from a first record to said recording means; and means independent of said first record source for transmitting to said recording means items of nil value for extending each varying group of the first record to conform with the predetermined extent of the corresponding group of said first mentioned record.

8. A device of the character set forth in claim 6 including; means for recording data on a tape in which item groups of data are arranged in a block of predetermined extent; means for transmitting data, in item groups of varying extent, from a card to said recording means; and means, for feeding items of nil value to the recording means, independently of said card, to fill out positions on the tape, remaining to complete a block, after the card data has been recorded on the tape.

9. A device of the character set forth in claim 6 including; means for recording data on a record in which item groups are of predetermined extent; means for transmitting data, in item groups of varying extent, from a first record, to said recording means; and means, independent of said first record source, for transmitting to said recording means items of nil value for extending each varying group and the groups collectively of the first record to conform to the predetermined extent of the total groups in said first mentioned record.

10. The combination with means for successively sensing rows of data designations arranged in columnwise order in a record and means for feeding the record past said sensing means; of data storage detector means; means cooperating with the leading edge of said record for initiating a pulse in a circuit including row counter means, pulse recirculating means for feeding pulses, corresponding to column data sensed, to said storage means and for stepping said row counter to send pulses corresponding to each row being sensed to the storage means, whereby the coincidence of pulses, corresponding respectively to the rows and columns, deposits the data in said storage means.

11. The combination with means for successively sensing rows of data designations arranged, in a record, in columnwise order, and means for feeding the record past said sensing means; of means coordinated with said feeding means for initiating a pulse in a circuit including data storage means, row counter means, pulse data storage means, pulse circulating means for feeding pulses, corresponding to column data sensed, to said storage means and for stepping said row counter to send pulses, corresponding to each row being sensed, to the storage means, and gates conditioned by said pulse circulating means for controlling the feed of row count pulses to said storage means whereby the coincidence of pulses, corresponding respectively to the rows and columns deposits the data in said storage means.

12. The combination with means for sensing columns of data designations arranged in a record in successive row order and means for feeding the record past said sensing means; of record detecting means controlled by the position of said record in the sensing means for initiating a pulse in a circuit including data storage means, row counter means, pulse circulating means for feeding pulses corresponding to column data sensed to said storage means and for stepping said row counter to send pulses corresponding to each row being sensed to the storage means, gates conditioned by said pulse circulating means for controlling the feed of row count pulses to the storage means in one arrangement, and adjustable read-check relay means for feeding pulses from the row counter to said gates in different order whereby the pulses corresponding to the rows are varied in point of coincidence with the pulses corresponding to the columns to deposit the data in the storage means in another arrangement to check the operating condition of said storage means.

13. The combination with record sensing means, disposed at spaced sensing stations, for successively sensing rows of data designations arranged in a record in columnwise order and means for feeding the record past each sensing means; of record detecting means controlled by the position of said record in either sensing means for initiating a pulse in a circuit including data storage means, sensing station selecting switch means, row counter means, pulse transfer means synchronized with the row sensing of the record and means for circulating said initial pulse under control of the row counter and the transfer means for feeding pulses, corresponding to column data sensed, to said storage means and for stepping said row counter to send pulses, to the storage means, corresponding to each row being sensed whereby the coincidence of row and column pulses deposits the data in said storage means, and said switch means being controlled by a pulse from the row counter to include either of said sensing means in said circuit.

14. The combination with record sensing means disposed at first and second sensing stations, for successively sensing rows of data designations arranged in a record in columnwise order and means for feeding the record past each sensing means; of common record detecting means, controlled by the position of the leading edge of said record in either sensing station, for initiating a pulse in a circuit including data storage means, sensing station selecting switch means, row counter means, means for recirculating said initial pulse independently of said pulse initiating means for feeding pulses corresponding to data in columns sensed to said storage means and for stepping said row counter to send pulses corresponding to each row being sensed, to the storage means whereby the coincidence of pulses corresponding respectively to the rows and columns, deposits the data in said storage means, and said switch means being controlled by pulses from said counting means to selectively include the first or second sensing stations in said circuit.

15. The combination with spaced means for sensing data in a record and means for feeding the record to bring spaced row positions of the data in succession to each sensing means; of record detecting means controlled by the leading edge of the record at each sensing means for initiating a pulse in a circuit including, a row counter, data storage means, gate means, the sensing means, and means for recirculating the pulse independently of said pulse initiating means, through the sensing means and to step the counter for sending pulses to said storage means and to said gate means to suppress a pulse to said sensing means after a predetermined row count.

16. The combination with means for sensing data at data designation positions arranged in successive row and column order in a record and means for feeding the record past said sensing means; of record detecting means, controlled by the position of the record when the first row thereof is in register with the sensing means, for initiating a pulse in a circuit including the sensing means, a data storage means, a row counter means and means for recirculating said initial pulse, independently of said pulse initiating means, for energizing said sensing means to feed pulses to the storage means corresponding to the column data sensed and for also stepping said row counter to send pulses to said storage means corresponding to the row positions of the data sensed whereby the data is deposited in the storage means at the coincidence of the row and column pulses.

17. Apparatus as in claim 16 wherein the output of a gate component in said recirculating path pulses said sensing means and simultaneously opens input gate components associated with the storage means for passing row counter pulses to said storage means when the counter is stepped and the sensing means energized.

18. A machine of the character set forth in claim 6 including a record misfeed signalling means included in circuit with said sensing, counting and detecting means for operation in a predetermined time interval after said record feeding means is operated.

19. The combination with means for sensing data designation positions arranged in successive row and column order in a record and means for feeding the record past said sensing means; of record detector means, controlled by the position of the record when the first row thereof is in register with the sensing means for initiating a pulse in a circuit including the sensing means, a data storage means, a row counter means and means for recirculating said initial pulse independently of said pulse initiating means for energizing said sensing means to feed pulses to the storage means corresponding to the column data sensed and for also stepping said row counter to send pulses, corresponding to the row positions of the data sensed, to said storage means, whereby the data is deposited in the latter at the points of coincidence of the row and column pulses; means for recording the data from the storage on a tape; means for moving said tape in opposite directions past said recording means; and circuit means governed by said row counter for controlling the operation of said tape moving means.

20. Apparatus as in claim 19 including erase means operable when the tape has attained full uniform speed in one direction whereby the recording of harsh pulses are prevented, and circuit means for rendering said erase means ineffective after a predetermined time interval.

21. Apparatus as in claim 19 including means for reading the recorded data from the tape when the latter is moving in one direction and means for checking the code content of said data.

22. Apparatus as in claim 19 in which said row counter, after a predetermined row count, suppresses the recirculated pulse to said sensing means.

23. In a device of the character described; first and second means for sensing data designation positions arranged in successive row and column order in a record; means for feeding the record past both sensing means; means associated with each sensing means for detecting the leading edge of the record, when the data positions of the first row of the latter are in position to be sensed in either sensing means, and for initiating a pulse in a circuit including the sensing means, data storage means, row counting means, and means for recirculating said initial pulse independently of said pulse initiating means for energizing the sensing means to feed pulses to the storage means corresponding to the column data sensed and for also stepping said row counter to send pulses, corresponding to the row position of the data sensed, to said storage means; and means controlled by the row counter for selectively conditioning the circuit, to serve the first sensing and detecting means for a reading operation, and to serve the second sensing and detecting means for a checking operation.

24. Apparatus as in claim 23 including coding circuit means; comparing circuit means; means for transmitting the data from said storage means; and means controlled by said row counter for selectively conditioning said storage data transmitting means to serve said coding means or said comparing means.

25. In a device of the character described, first and second means for sensing data designation positions arranged in successive row and column order in a record; means for feeding the record past both of said means; means associated with each sensing means for detecting the leading edge of the record when the data positions of the first row are in position, in each sensing means, to be sensed; circuit means, common to the sensing means and the detecting means, for receiving an initial pulse when a record is detected; means for circulating said pulse; and pulse operated means for conditioning the circuit to serve the first sensing means and its associated leading edge detecting means for a reading operation and for conditioning the circuit to serve the second sensing means and its associated leading edge detector for a checking operation.

26. The combination with means for sensing data designation positions arranged in successive row and column order in a record and means for feeding the record past said sensing means; of means, controlled by the position of the record when the first row thereof is in register with the sensing means, for initiating a pulse in a circuit including the sensing means, a data storage means, a row counter means and means for recirculating said initial pulse independently of said pulse initiating means for energizing said sensing means to feed pulses to the storage means corresponding to the column data sensed and for also stepping said row counter to send pulses, corresponding to the row positions of the data sensed, to said storage means, whereby the data is deposited in the latter at the points of coincidence of the row and column pulses; means for recording the data from the storage on a tape; means for moving said tape in opposite directions past said recording means; and circuit means governed by said row counter for controlling the operation of said tape moving means.

27. The combination with means for sensing data designation position arranged in successive row and column order in a record and means for feeding the record past said sensing means; of means, controlled by the position of the record when the first row thereof is in register with the sensing means, for initiating a pulse in a circuit including the sensing means, a data storage means, a row counter means and means for recirculating said initial pulse independently of said pulse initial, means for energizing said sensing means to feed pulses to the storage means corresponding to the column data sensed and for also stepping said row counter to send pulses corresponding to the row positions of the data sensed, to said storage means, whereby the data is deposited in the latter at the points of coincidence of the row and column pulses; means for recording the data from the storage on a tape; a pulse timing circuit, including a cycling unit and a column counting means for reading data out of the storage to said tape recording means; and said row counter controlling the operation of said pulse timing circuit.

28. The combination with means for sensing data designation positions arranged in successive row and column order in a record and means for feeding the record past said sensing means; of means, controlled by the position of the record when the first row thereof is in register with the sensing means, for initiating a pulse in a circuit including the sensing means, a data storage means, a row counter means and means for recircuating said initial pulse independently of said pulse initiating means for energizing said sensing means to feed pulses to the storage means corresponding to the column data sensed and also for stepping said row counter to send pulses, corresponding to the row positions of the data sensed, to said storage means, whereby the data is deposited in the latter at the points of coincidence of the row and column pulses; means for recording data from the storage on a tape; a pulse timing circuit including a cycling unit and a column counting means for reading data out of the storage and for adding nil data pulses to the data read out of said storage for recording on said tape.

29. In a machine of the character described; first and second means for sensing data designation positions arranged in row and column order in a record; means for feeding the record through said sensing means successively; means controlled by the position of the record, when the first row thereof is in register with either of the sensing means, for initiating a pulse in a circuit including either sensing means, data storage means, row counter means; means for moving a tape in two directions, means for recording data on the tape from the storage means; data checking means; comparing means for receiving data from said storage, means for reading data from the tape for transmission to said checking means and to said data comparing means, a circuit including said record and checking means, another circuit including said reading and comparing means and means controlled by said row counter for selectively feeding data out of the storage to said checking means circuit or to said comparing circuit and means controlled by the row counter for controlling the operation of said tape moving means in accordance with the operation of said selective feed means.

30. The combination with spaced means for sensing data in a card and movable means for feeding the card to bring data positions of the latter in succession to each of the sensing means; of detectors associated with each sensing means and coacting with the leading edge of the card for initiating a pulse; means for storing the sensed data; means for recording data on and reading data from a moving tape; means for encoding data, fed from said storage means to be recorded on said tape, including a pulse sprocket indication for each item of data encoded; circuit cycling unit means for feeding the data out of the storage to said recording means; comparing means to which data is fed from the storage means and the tape reading means; circuit means operated by the reading of said sprocket indication for controlling said circuit cycling means to coordinate the feed of the data from the storage means and the tape reading means to said comparing means; and means for decoding the data fed from said reading means to the comparing means.

31. The combination with spaced means for sensing data in a card and movable means for feeding the card to bring data positions of the latter in succession to each of the sensing means; of detectors associated with each sensing means and coacting with the leading edge of the card for initiating a pulse; means for storing the sensed data; means for recording the sensed data on a tape, means for reading data from the tape, said recording means including a sprocket designation for each item of data recorded; a circuit cycling unit means for feeding data out of the storage to said recording means; comparing means to which data is fed from the storage means and the tape reading means; and circuit means operated by the reading of said sprocket designation for controlling said circuit cycling means to coordinate the feed of the data from the storage means and the tape reading means to said comparing means.

32. The combination with spaced means for sensing data in a card and movable means for feeding the card to bring data positions of the latter in succession to each of the sensing means; of detectors associated with each sensing means and coacting with the leading edge of the card for initiating a pulse; means for storing the sensed data; means for recording data on and reading data from a moving tape; means for moving the tape in one direction; plural means for checking data read from the tape moving in forward and reverse directions; and one of said checking means being adapted for operation when the tape moves in forward direction after said first mentioned forward and reverse directions.

References Cited in the file of this patent

UNITED STATES PATENTS

| | | |
|---|---|---|
| 2,448,781 | Daly | Sept. 7, 1948 |
| 2,569,840 | Whalen | Sept. 16, 1949 |
| 2,700,755 | Burkhart | Jan. 25, 1955 |
| 2,702,380 | Brustman et al. | Feb. 15, 1955 |
| 2,718,356 | Burrell et al. | Sept. 20, 1955 |
| 2,739,301 | Greenfield | Mar. 20, 1956 |
| 2,774,056 | Stafford et al. | Dec. 11, 1956 |
| 2,792,987 | Stibitz | May 21, 1957 |
| 2,793,344 | Reynolds | May 21, 1957 |
| 2,817,829 | Lubkin | Dec. 24, 1957 |
| 2,831,634 | Luhn | Apr. 22, 1958 |
| 2,832,063 | McMillan et al. | Apr. 22, 1958 |
| 2,850,234 | Bartelt | Sept. 2, 1958 |
| 2,921,293 | Bartelt | Jan. 12, 1960 |
| 2,990,538 | Weidenhammer | June 27, 1961 |

UNITED STATES PATENT OFFICE
CERTIFICATE OF CORRECTION

Patent No. 3,085,229                                    April 9, 1963

Edwin I. Blumenthal

It is hereby certified that error appears in the above numbered patent requiring correction and that the said Letters Patent should read as corrected below.

Column 13, line 65, after "comes" insert -- under --; column 21, line 2, for "417" read -- G417 --; line 17, for "FF330A" read -- FF300A --.

Signed and sealed this 19th day of November 1963.

(SEAL)
Attest:

ERNEST W. SWIDER

Attesting Officer

EDWIN L. REYNOLDS

Acting Commissioner of Patents